US012240101B2

(12) United States Patent
Joulin

(10) Patent No.: US 12,240,101 B2
(45) Date of Patent: Mar. 4, 2025

(54) VACUUM GRIPPER DEVICE WITH FOAM LAYER SECURED BY MAGNETIC ATTRACTION

(71) Applicant: JOULIN CEMMA, Etampes (FR)

(72) Inventor: Laurent Joulin, Issy-les-Moulineaux (FR)

(73) Assignee: PIAB AKTIEBOLAG, Danderyd (SE)

( * ) Notice: Subject to any disclaimer, the term of this patent is extended or adjusted under 35 U.S.C. 154(b) by 154 days.

(21) Appl. No.: 17/313,696

(22) Filed: May 6, 2021

(65) Prior Publication Data

US 2021/0354314 A1    Nov. 18, 2021

(30) Foreign Application Priority Data

May 13, 2020 (EP) .................................. 20315239

(51) Int. Cl.
*B25J 15/06* (2006.01)
*F16B 1/00* (2006.01)

(52) U.S. Cl.
CPC ....... *B25J 15/0691* (2013.01); *B25J 15/0683* (2013.01); *F16B 1/00* (2013.01); *F16B 2200/83* (2023.08); *F16B 2200/99* (2023.08)

(58) Field of Classification Search
CPC .... B25J 15/0691; B25J 15/0683; B25J 15/04; B25J 15/0441; B66C 1/0281; F16B 2001/0035; F16B 2001/0092
USPC .................................................. 294/189, 65
See application file for complete search history.

(56) References Cited

U.S. PATENT DOCUMENTS

| 4,389,064 | A | * | 6/1983 | Laverriere | B66C 1/025 428/136 |
| 5,671,910 | A | * | 9/1997 | Davies | B25B 11/005 269/21 |
| 5,971,454 | A | * | 10/1999 | Baan | B25B 11/005 294/87.1 |
| 7,726,715 | B2 | * | 6/2010 | Nagasawa | B25J 15/0616 294/189 |
| 7,793,408 | B2 | * | 9/2010 | Oh | H01L 21/6838 29/729 |
| 9,238,305 | B2 | * | 1/2016 | Regan | B25J 15/0675 |
| 10,688,669 | B2 | * | 6/2020 | Ferguson | B25J 15/0061 |
| 2008/0197644 | A1 | * | 8/2008 | Gebhart | B66C 1/025 414/800 |
| 2020/0260895 | A1 | * | 8/2020 | Carroll | A47G 19/10 |

FOREIGN PATENT DOCUMENTS

| CN | 110355778 A | 10/2019 |
| DE | 10316125 B3 | 8/2004 |
| DE | 202009014155 U1 | 2/2010 |
| EP | 3409623 A1 | 12/2018 |
| JP | H0691576 A | 4/1994 |

OTHER PUBLICATIONS

English translation of German patent DE 103 16 125 (Year: 2004).*

* cited by examiner

*Primary Examiner* — Dean J Kramer
(74) *Attorney, Agent, or Firm* — MUNCY, GEISSLER, OLDS & LOWE, P.C.

(57) ABSTRACT

A foam vacuum gripper device comprising at least a vacuum gripper body and at least one foam layer arranged on a bottom surface of the vacuum gripper body, at least the foam layer is secured to the vacuum gripper body by way of a magnetic attraction between the bottom surface of the vacuum gripper body and the foam layer.

24 Claims, 25 Drawing Sheets

VACUUM GRIPPER DEVICE WITH FOAM LAYER SECURED BY MAGNETIC ATTRACTION

The present disclosure relates generally to foam vacuum gripper devices, and optionally to improved foam vacuum gripper apparatus, kits, assemblies, and methods.

BACKGROUND OF THE INVENTION

It is desirable to provide, in materials handling, systems for picking up and carrying large, heavy, or bulky materials, for example, cartons, barrels, buckets, wrapped products, bags, building materials, and/or sheet materials. Such systems often comprise a structure mounted to move along a frame or a robot and include a pick-up head operating by suction.

Conventional type systems have employed a suction pick-up head including a soleplate supporting rows of compartments with openings fitting together, the pick-up head being in communication with a suction device. To provide better sealing of the contact between the soleplate and an article to be picked up, a sealing material is often provided on the underside of the soleplate, for example foam layer, whose characteristics are adaptable to the surface state of the articles to be picked up. However, the suction pick-up heads are repeatedly exposed to conditions that cause wear to various parts of the pick-up head and repair or replacement of those parts is often time-consuming, expensive, and requires skilled technicians. Excessive downtime in material handling facilities creates unnecessary expense and disrupts distribution schedules.

Usually, adhesive is used to seal and attach foam to the body of the vacuum gripper. The adhesive is difficult to remove and may tear the foam upon removal. The adhesive and/or foam, in many instances, must then be removed to have the vacuum gripper parts replaced and reassembled. If different thickness of foam is desired, removal may cause damage and excessive downtime, therefore the foam parts are not very replacement prone or replacement friendly. Foam parts, once torn, are not interchangeable or reusable.

Moreover the adhesive could leave glue on the sole of the body of the vacuum gripper. Then, cleaners are then often required for removal of adhesive from in between foam and various layers, with heavy downtime occurring while the adhesive is laboriously scoured from the vacuum gripper parts. Exposure to such cleaners by personnel is also not desirable.

Moreover in cold environments, such as warehouses, may have detrimental effects on adhesive attachment for parts being separated and re-assembled. Re-assembled parts requiring adhesive application can easily wrinkle, reducing adhesive strength and causing vacuum leaks.

OBJECT OF THE INVENTION

An object of the invention is to provide an alternative user-friendly, time-saving foam vacuum gripper device.

SUMMARY OF THE INVENTION

In order to achieve this object, the invention proposes a foam vacuum gripper device comprising at least a vacuum gripper body and at least one foam layer arranged on a bottom surface of the vacuum gripper body.

According to the invention, at least the foam layer is secured to the vacuum gripper body by way of a magnetic attraction between the bottom surface of the vacuum gripper body and the foam layer.

Therefore as the foam layer is attached to the bottom surface by magnetic attraction, the foam layer is easier to remove. Thus, the invention is easier to service, with parts that are more easily accessible. Moreover the invention does not require excessive repair and replacement time.

The invention could be also directed to other challenges.

In some examples, the foam layer being secured magnetically allows removal of one foam layer at a particular thickness T0 to be removed and replaced with a foam layer at a variable thickness T1 without damaging the initial foam at a particular thickness T1 which could be used again later.

Optionally, the device includes an attractant layer and a magnetic layer, one of the layers included in the vacuum gripper body and the other layer included in the foam layer.

Optionally, said attractant layer is selected from a layer of magnet, layer of rubber steel, a layer of metal, or a layer of steel.

Optionally, the foam layer is a continuous layer so that only one foam layer is in contact with the bottom surface of the foam vacuum gripper body.

Optionally, the foam layer is puzzle foam, the foam layer being then composed of at least two foam pieces assembled together.

Optionally, the device comprises at least two foam layers, one layer arranged on top of the other, both foam layers being arranged on the bottom surface of the vacuum gripper body.

Optionally, each of the two foams layers form one of the main layers to that both foams layers are secured to one another by way of the magnetic attraction.

Optionally, the device comprises at least one filter arranged between two main layers of the device.

Optionally, the device comprises at least one alignment element for alignment of the foam layer relatively to the vacuum gripper body.

Optionally, the alignment element is removable from the device.

Optionally, the alignment element is an alignment pin.

Optionally, wherein the vacuum gripper body includes a bottom plate, the bottom plate being removably secured on one face to remaining part of the foam vacuum gripper body through magnetic attraction and the foam layer being also removably secured to an opposite face of the bottom plate through the magnetic attraction, the foam layer being then removably secured to the vacuum gripper body through the bottom plate.

Optionally, the bottom plate is comprised solely of magnetic or attractant material.

Optionally, the vacuum gripper body includes a frame and a top plate, the top plate being also secured to the frame by way of a magnetic attraction between top plate and frame.

Optionally, the vacuum gripper body includes a frame and a leakage limiter system, the leakage limiter system being also secured to the frame by way of a magnetic attraction between the leakage limiter system and frame.

The leakage limiter system could be a check valve system, a calibrated holes system, a clamping foam layer . . . depending of the type of foam vacuum gripper device that is considered.

Optionally, the vacuum gripper includes a leakage limiter system integrated in the foam layer.

The leakage limiter system could be a check valve system, a calibrated holes system, a clamping foam layer . . . depending of the type of foam vacuum gripper device that is considered.

Optionally, the vacuum gripper body includes a frame and a check valve system, the check valve system being also secured to the frame by way of a magnetic attraction between the check valve system and frame.

Optionally, the foam vacuum gripper device comprises at least a vacuum gripper body and at least one foam layer arranged on a bottom surface of the vacuum gripper body, at least the foam layer is secured to the vacuum gripper body by way of a magnetic attraction between the bottom surface of the vacuum gripper body and the foam layer, wherein the device includes an attractant layer and a magnetic layer, one of the layers included in the vacuum gripper body and the other layer included in the foam layer, wherein the device include a series of air ducts extending at least through the foam layer, the magnetic layer and the attractant layer.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which:

FIG. 5 is a side perspective view of the foam vacuum gripper device introduced FIG. 1 with representation of a vacuum module of said foam vacuum gripper device;

DESCRIPTION OF EMBODIMENTS

Figure 1:
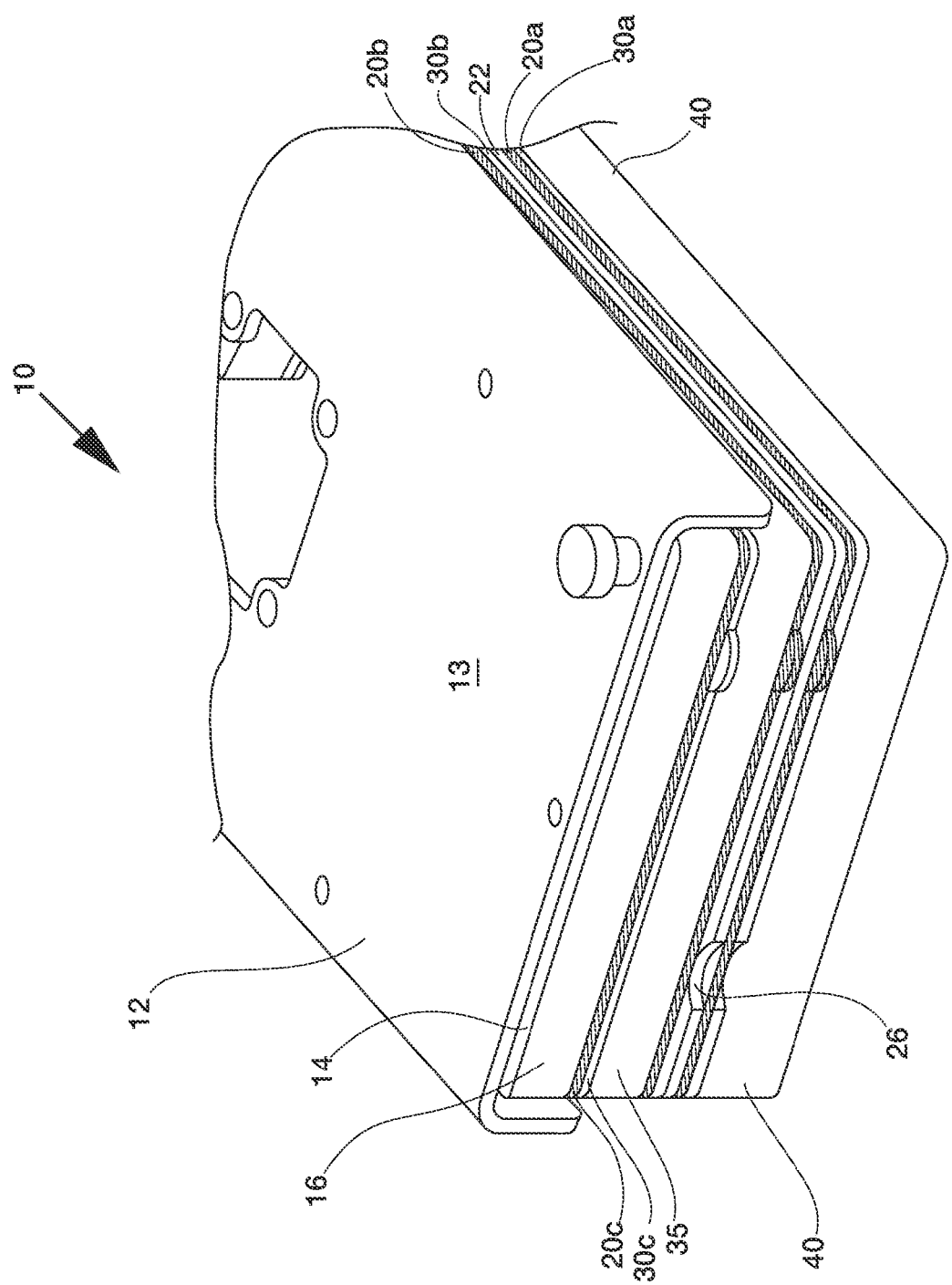
FIG. 1 is an end perspective view of a foam vacuum gripper device according to a first embodiment of the invention.
Figure 2A:
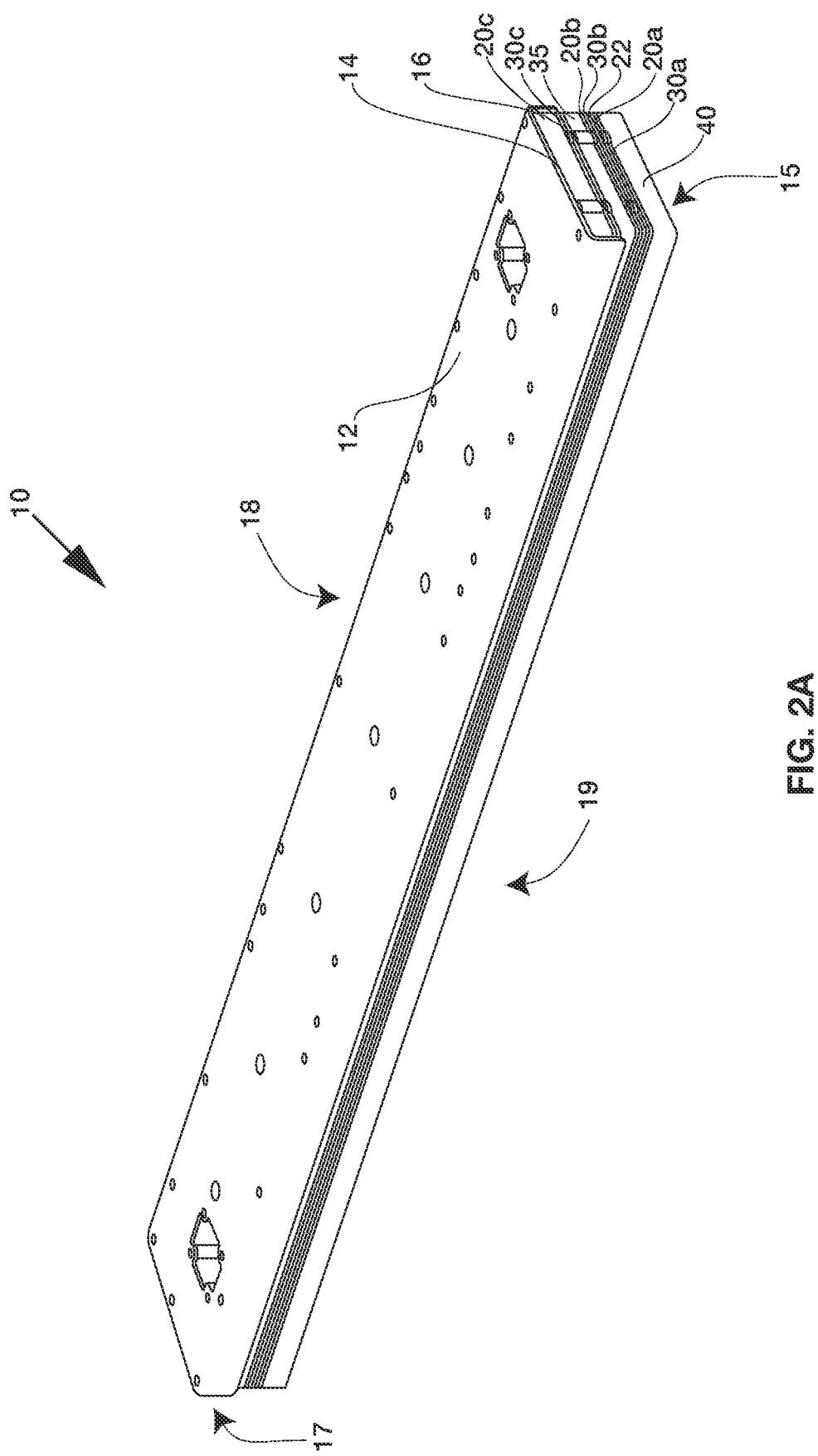
FIG. 2A is a side perspective view of the foam vacuum gripper device introduced in FIG. 1.
Figure 2B:
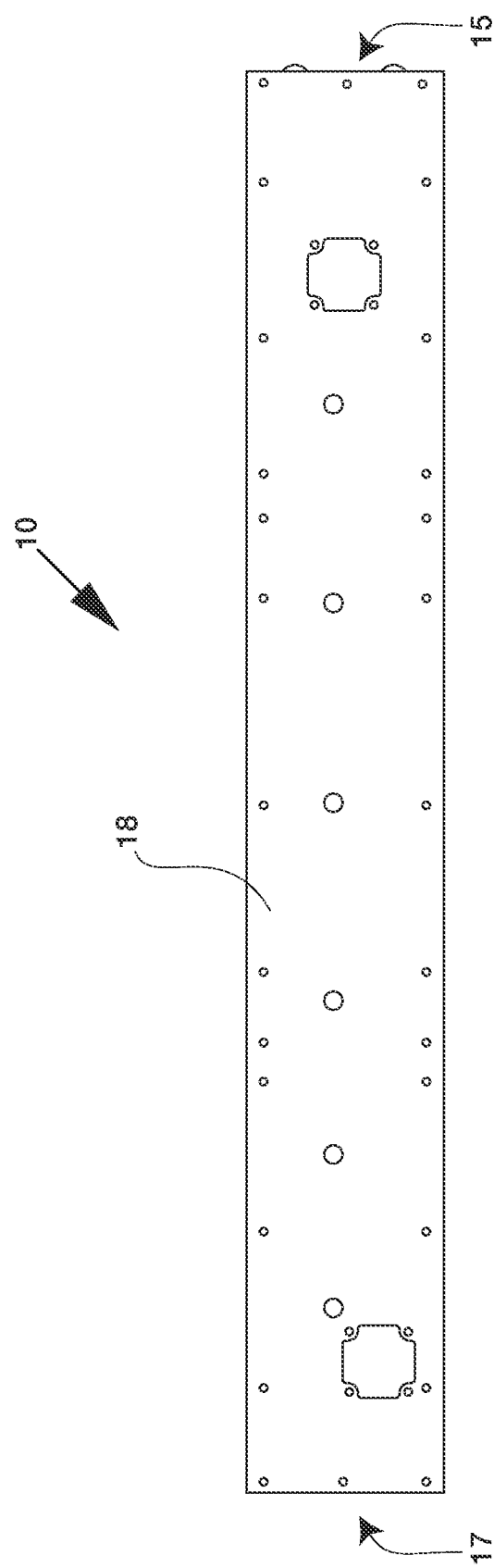
FIG. 2B is a top view of the foam vacuum gripper device introduced in FIG. 1.
Figure 2C:
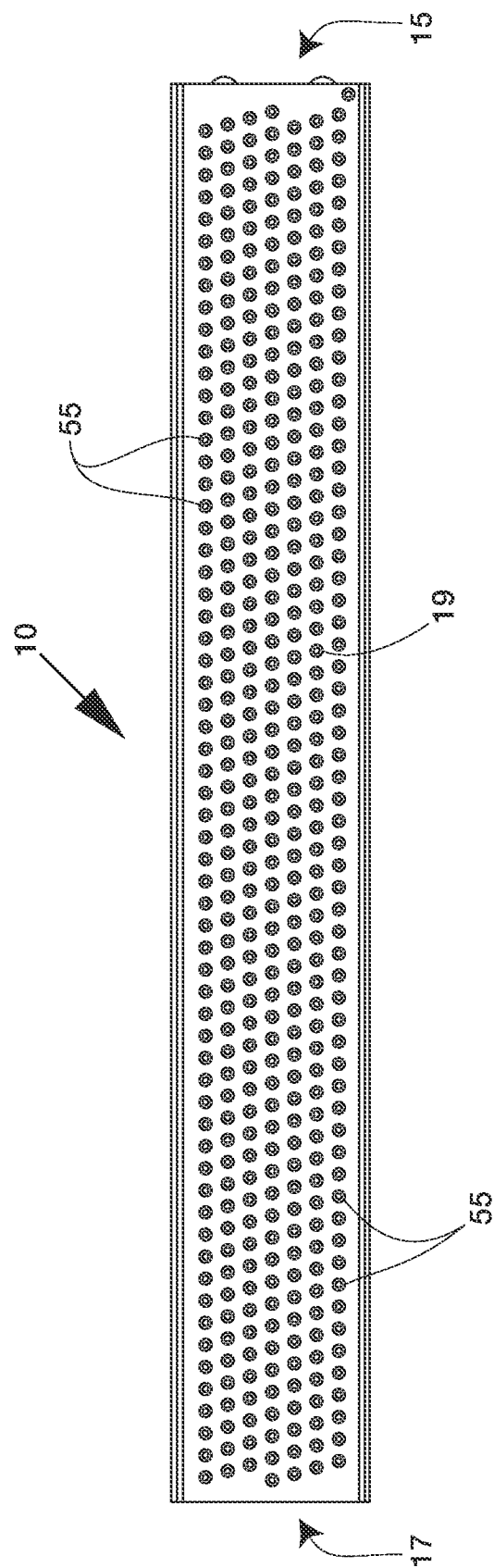
FIG. 2C is a bottom view of the foam vacuum gripper device introduced in FIG. 1.
Figure 3:
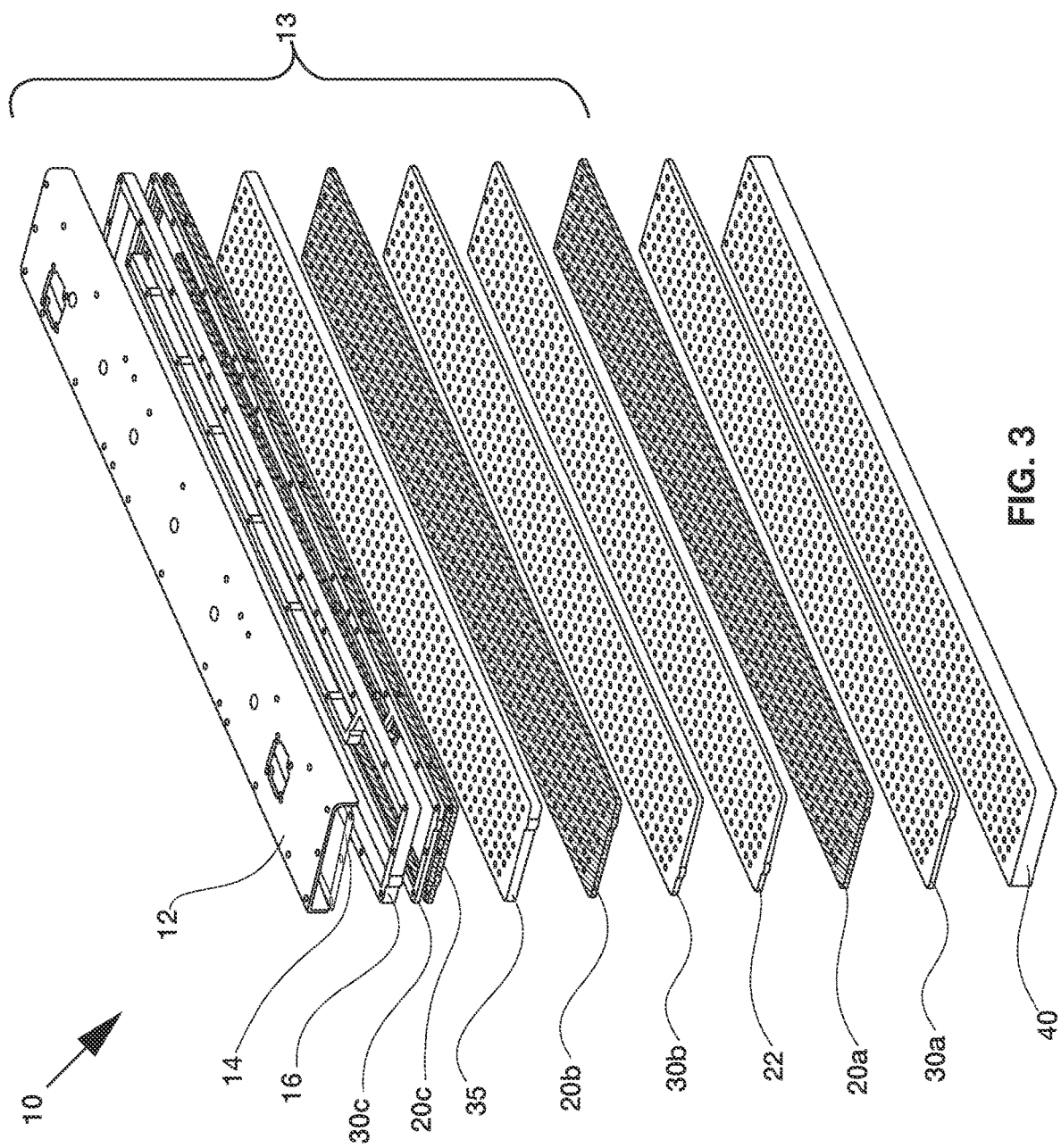
FIG. 3 is an exploded perspective view of the foam vacuum gripper device introduced in FIG. 1.
Figure 4:
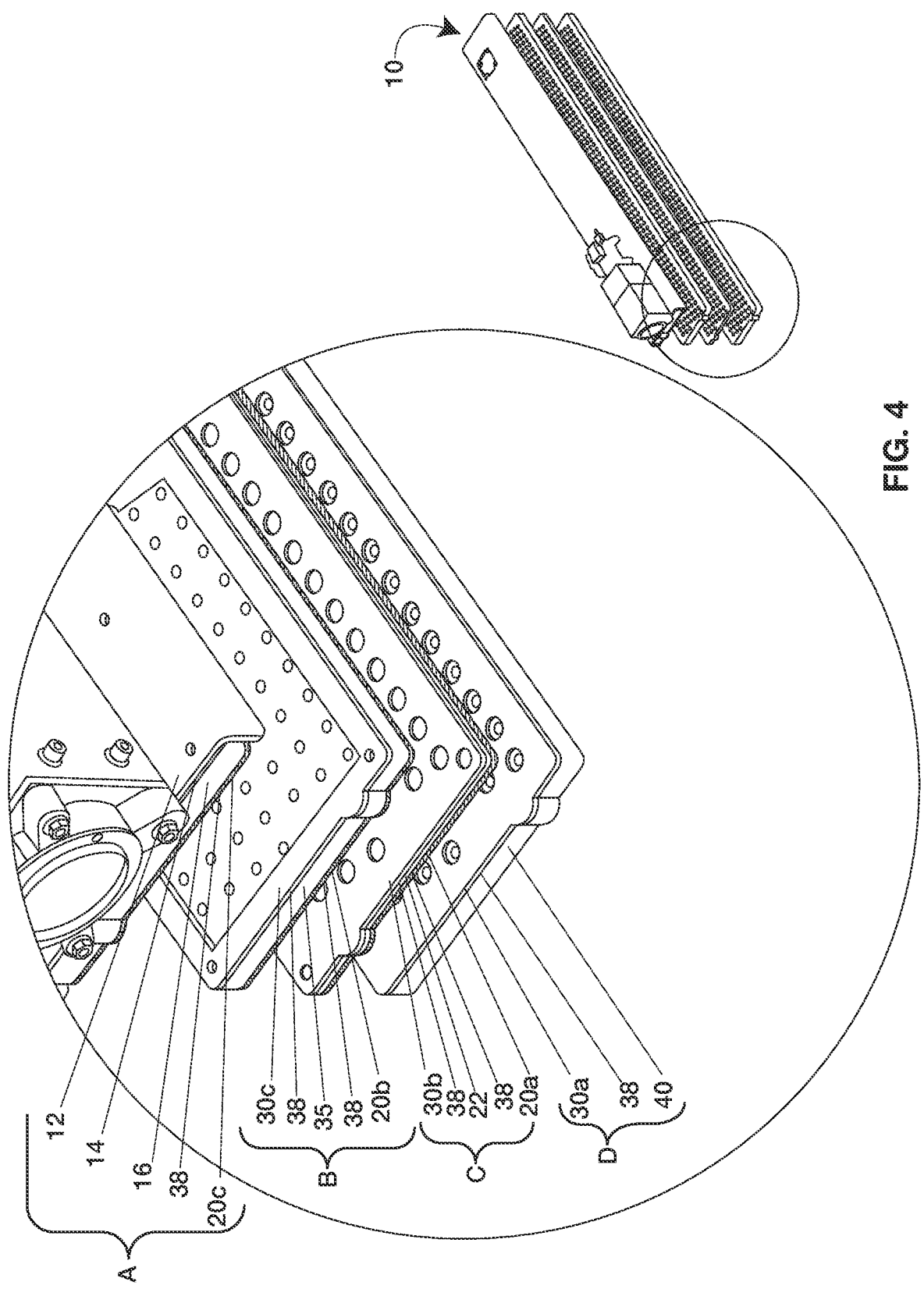
FIG. 4 is an exploded perspective end view of the foam vacuum gripper device introduced in FIG. 1.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general, it will be understood that the illustrations are for the purpose of describing embodiments of the disclosure and are not intended to limit the disclosure or any invention thereto.

FIGS. 1-8 introduce a first particular embodiment of the invention being a foam vacuum gripper device 10 including a vacuum gripper body 13 and at least one foam layer. Optionally, the device 10 includes only one foam layer 40.

The device 10 may include a top 18, a bottom 19, a first end 15 and a second end 17.

The foam vacuum gripper device 10 may be a valve gripper device by way of example.

The foam layer 40 is arranged on a bottom surface of the vacuum gripper body 13. The foam layer 40 is secured to the vacuum gripper body 13 by way of a magnetic attraction between the bottom surface of the vacuum gripper body and the foam layer 40.

In this first embodiment, the vacuum gripper body 13 includes at least one layer and preferably a series of at least two layers.

The layers collectively may form an upper compartment chamber and a lower magnetic base.

The upper compartment chamber may include:
a top plate
an air chamber section housed in a frame
a magnetic section,
an attractant section, and/or
a check valve system, and/or
various combinations thereof.

The lower magnetic base may include:
a bottom plate,
a magnetic layer,
an attractant layer,
and/or various combinations thereof.

Optionally, the upper compartment comprises a first main layer that is a top plate 12, a second main layer, arranged below the top plate 12 and being an air chamber section housed in a frame 16 and a third main layer, arranged below the frame 16 and being a check valve system 35.

In fact, a vacuum source deported from the device 10 may provide suction to the device 10 and may communicate with the device 10 through the top plate 12. The frame 16 may fit with the top plate 12 to create a compartment supporting air flow.

The top plate 12, may by example, be in aluminum, in high-density polyethylene (HDPE), in Polyoxymethylene. . . . The frame 16 may by example, be in aluminum, in high-density polyethylene (HDPE), in Polyoxymethylene. . . . The check valve system 35 may be a HDPE, polyoxymethylene, aluminum, and/or other check valve system.

The top plate 12 and the frame 16 could be two different parts or could be in one piece.

Optionally, the lower magnetic base comprises a fourth main layer arranged below the check valve system 35 and being a bottom plate 22.

The bottom plate 22 may, by way of example, be an aluminum bottom plate.

The foam layer 40 is arranged in the present case below the bottom plate 22 and forms a fifth main layer of the device 10. Therefore in the present case, the foam layer 40 is in fact secured to the bottom plate 22 by way of said magnetic attraction.

The foam layer 40, by way of example, may be in EPDM foam. The foam layer 40 may be an M-Class rubber under ASTM D-1418. The foam layer 40 may be a texturized foam layer. A foam layer 40, in some embodiments, may be considered a soft, flexible pad, and/or a resilient pad, that may include air ducts. The device 10 may include an attractant layer 30a and a magnetic layer 20a, one of the layers included in the vacuum gripper body 13 and the other of the layers included in the foam layer 40 in order to secure the foam layer 40 to the bottom plate 22 by said magnetic attraction. The foam layer 40 may include the attractant layer 30a or may include the magnetic layer 20a and so the vacuum gripper body includes respectively the magnetic layer 20a or the attractant layer 30a.

Optionally, the magnetic layer 20a is attached to the bottom face of the bottom layer 22 and the attractant layer 30a is attached to the upper face of the foam layer 40. Thus the attractant layer 30a is directly above the foam layer 40, the magnetic layer 20a is directly above the attractant layer 30a and the bottom plate 22 is directly above the magnetic layer.

The foam layer 40 may be adhesively attached to the magnetic layer 20a or to the attractant layer 30a. The bottom plate 22 may be adhesively attached to the magnetic layer 20a (if the foam layer 40 is attached to the attractant layer 30a (adhesively or not)) or to the attractant layer 30a (if the foam layer 40 is attached to the magnetic layer 20a (adhesively or not)).

In any case, the attractant layer 30a, in some embodiments may be selected from a layer of magnet, layer of rubber steel, a layer of metal, and/or a layer of steel. In fact, the attractant layer may be composed of any material attractive to a magnetic layer.

Optionally, other layers of the device 10 are secured to one another by way of magnetic attraction.

For example, the bottom plate 22 could be secured to check valve system 35 by way of magnetic attraction and/or the check valve system 35 could be secured to the frame 16 by way of magnetic attraction.

The magnetic attraction between the bottom plate 22 and the check valve system 35 and/or between the check valve system 35 and the frame could be realized in a same way or in different way than the magnetic attraction between the foam layer 40 and the bottom plate 22.

Thus, vacuum gripper body 13 may include one or more additional attractant layer and corresponding magnetic layer to secure at least one main layer within the body to one another.

The device 10 may thus include a second couple of attractant layer 30b and magnetic layer 20b, one of the layers included in check valve system 35 and the other of the layers included in the bottom plate 22. Optionally, the magnetic layer 20b is attached to the bottom face of the check valve system 35 and the attractant layer 30b is attached to the upper face of the bottom plate 22. Thus the attractant layer 30b is directly above the bottom plate 22, the magnetic layer 20b is directly above the attractant layer 30b and the check valve system 35 is directly above the magnetic layer. The bottom plate 22 and/or the check valve system 35 may be adhesively attached to the magnetic layer 20b or to the attractant layer 30b.

The device 10 may thus include a third couple of attractant layer 30c and magnetic layer 20c, one of the layers included in check valve system 35 and the other of the layers included in the frame 16. Optionally, the magnetic layer 20c is attached to the bottom face of the frame 16 and the attractant layer 20c is attached to the upper face of the check valve system 35. Thus the attractant layer 30c is directly above the check valve system 35, the magnetic layer 20c is directly above the attractant layer 30c and the frame 16 is directly above the magnetic layer. Optionally the top plate 12 is directly above the frame 16. The bottom plate 22 and/or the check valve system 35 may be adhesively attached to the magnetic layer 20c or to the attractant layer 30c.

Optionally, the attractant or the magnetic layer secured to one main layer of the device 10 is conformed in order to present a section with same form and/or same dimensions than the section of the main layer associated.

At least one notch 26 may assist with assembly and dis-assembly of the device 10 and/or the body 13. At least one notch 26 may be protruding from and end of the device and may be a recess at an end of the device.

The device 10 may include a series of aligned air ducts 55 extending vertically through the foam layer 40, the bottom plate 22, the check valve system 35 and all corresponding magnetic layers 20 and attractant layers 30. The air ducts 55 may terminate at an air chamber formed within the upper compartment chamber frame 16.

The air ducts may be substantially parallel.

This improves vacuum efficiency.

The magnetic attraction between main layers of the device 10 simplifies the re-alignment of the air ducts 55 when one part of the device was removed and put again in place.

Thus the check valve system 35 may include a set of wells forming the air ducts 55 inside the check valve system. Each well may include a stopper that is activated to block air flow when suction is not established with an item to be gripped with the device over the particular air duct 50.

For example each attractive layer is secured to the corresponding part of the device 10 by adhesive and each magnetic layer is secured to the corresponding part of the device 10 by adhesive but of course there is no adhesive between one magnetic layer and one corresponding attractive layer.

Each adhesive deposit forms an additional layer of the device 10.

Figure 5:
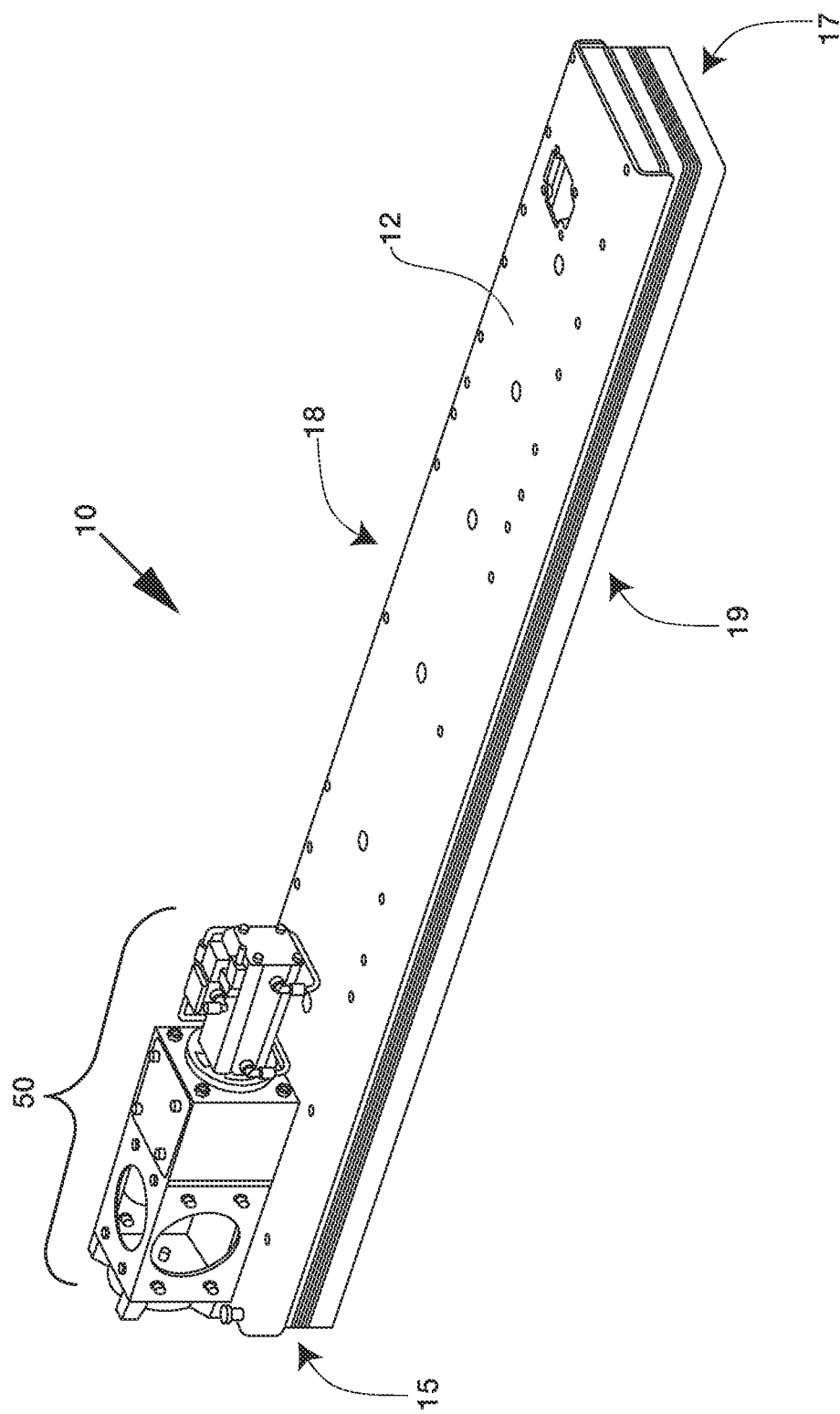
FIG. 5 illustrates in more detail the foam vacuum gripper device introduced FIG. 1.
Figure 6:
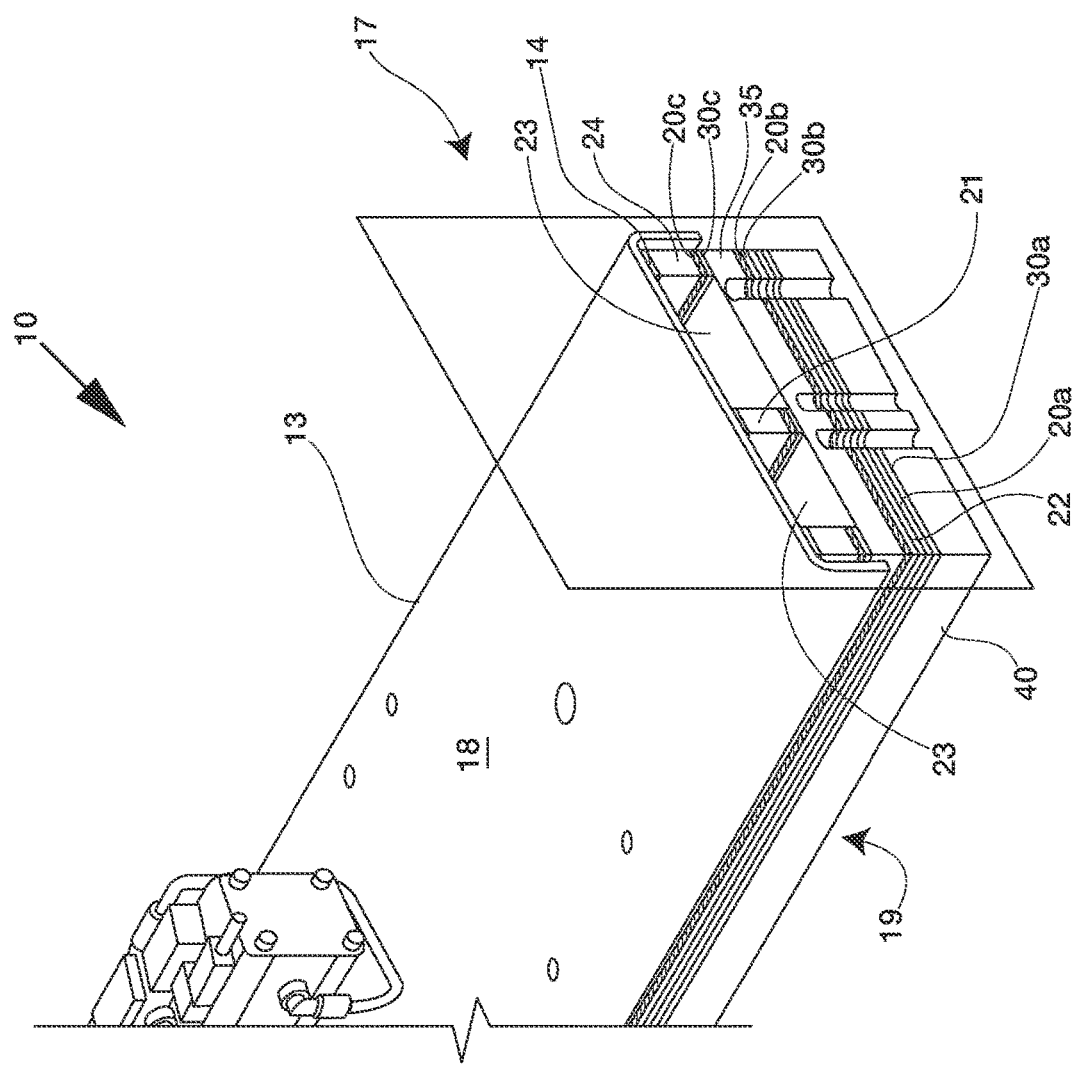
FIG. 6 is a cross-sectional end perspective view of the foam vacuum gripper device introduced FIG. 1.
Figure 7:
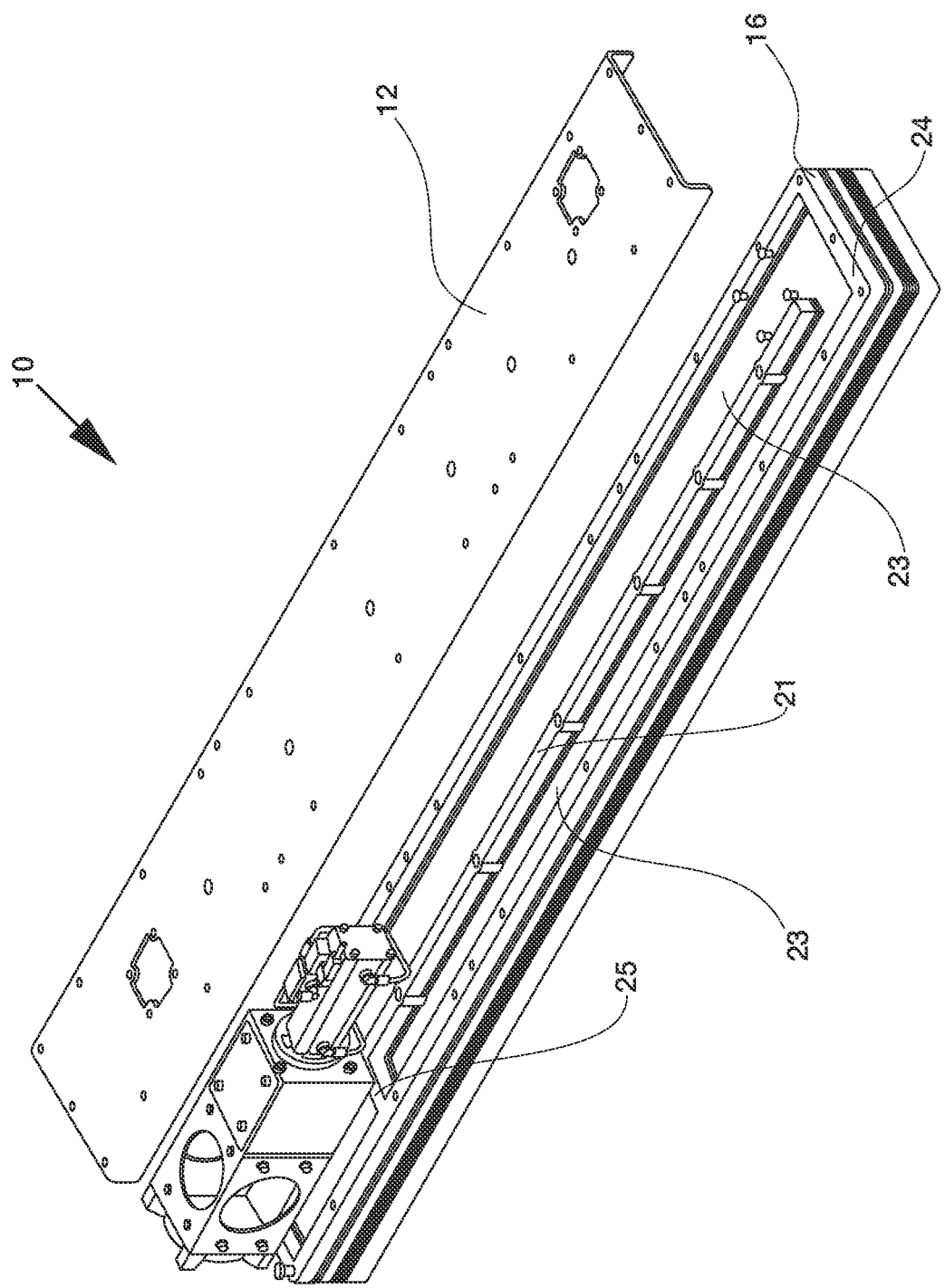
FIG. 7 shows the foam vacuum gripper introduced FIG. 1 with the top plate apart.
Figure 8:
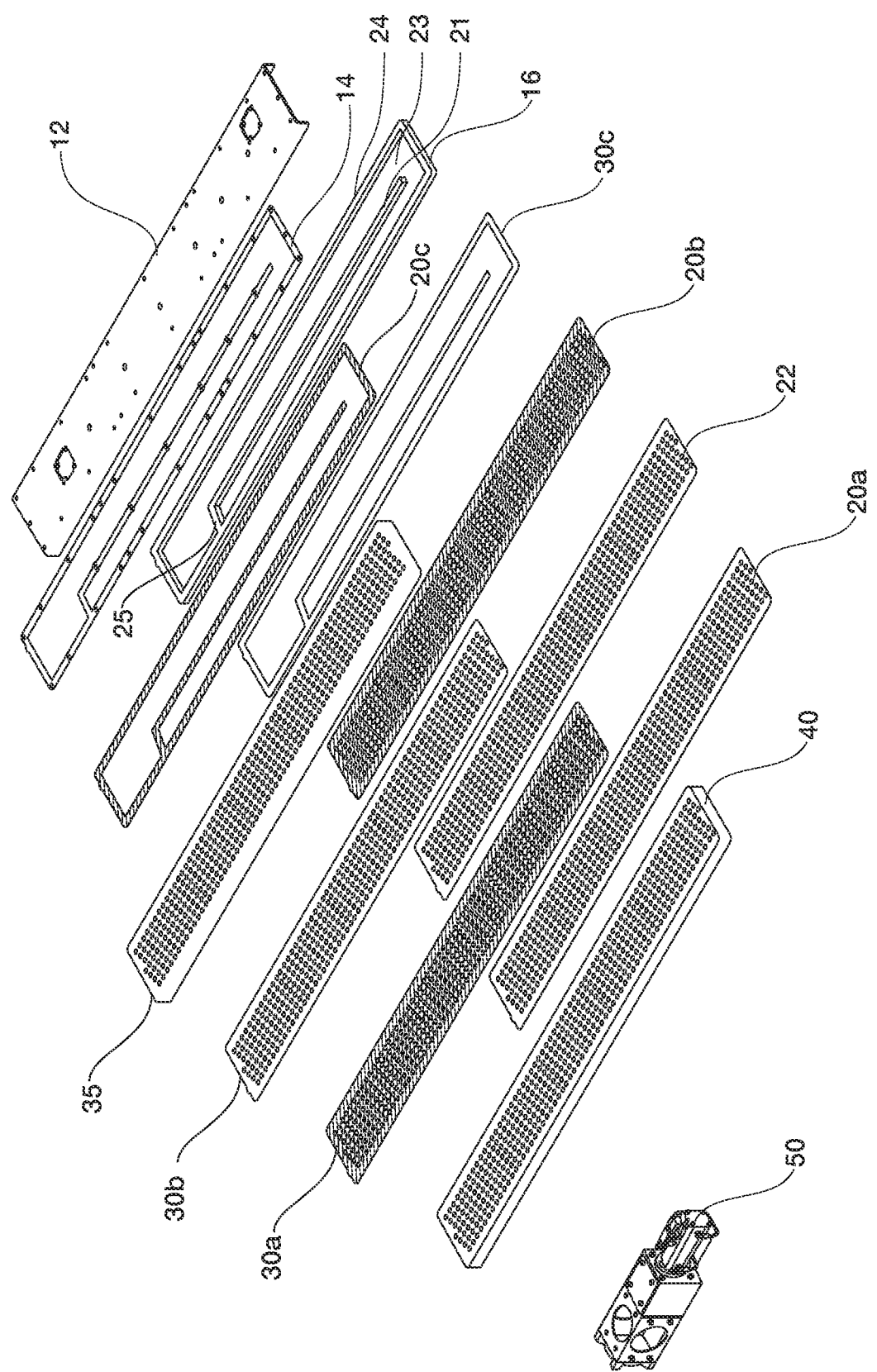
FIG. 8 is another exploded perspective view of the foam vacuum gripper device introduced in FIG. 1.

As the adhesive deposit is thin, the adhesive is not always represented in FIGS. 1 to 8. Just FIG. 5 shows in exaggerate view such adhesive layers 38.

Optionally the device 10 comprises a vacuum module 50 (that is only visible FIGS. 5 to 8).

The vacuum module 50 may be secured to the body 13. The vacuum module 50 may be secured to the upper face of the top plate 12.

The vacuum module 50 may be in communication with both the body 13 and a vacuum source that is deported from the device 10. The vacuum module 50 may control the flow of vacuum pressure from the vacuum source. The module 50 may let the vacuum go inside the device 10 for pick-up or to let fresh air coming into the device 10 for the release.

The vacuum module 50 may, in some examples, be a pick release module.

In another embodiment (not show), the device 10 comprises the vacuum source that is for example secured to the body 13.

In another embodiment (not show), the device 10 only comprises a connection to a vacuum source that is deported from the device 10 and to not comprises vacuum module 50.

Optionally the device 10 also includes at least one seal. Such a seal may contribute to the air tightness of the device 10 for a better, more efficient vacuum pressure.

The at least one seal may be included between layers (main layer and/or attractant layer 20 and/or magnetic layers), sections, and/or assemblies.

The seal may be attached to one of two layers by magnetic adhesion or another kind of adhesion for example by adhesive. The seal may also be itself a magnetic layer or an attractant layer.

For example the device 10 comprises one seal 14 arranged between the frame 16 and the top plate 12.

In view of the structure of the device 10 at least one assembly could be defined. The at least one assembly is made of at least one layer of the device.

For example the device 10 includes a top assembly A, a valve assembly B, a bottom assembly C and a foam assembly D.

The top assembly A includes the top plate 12, the seal 14, the frame 16 and the magnetic layer 20c.

The valve assembly B includes the attractant layer 30c, a check valve system 35, and the magnetic layer 20b.

The bottom assembly C includes the attractant layer 30b, the bottom plate 22 and the magnetic layer 20a.

The Foam assembly D includes the attractant layer 30a and foam layer 40.

Optionally the frame 16 has a standard rectangular frame shape.

Optionally the frame 16 presents a more complex shape.

For example the frame 16 presents an outside rectangular chassis 24 with an inside wall 21 extending parallel to the longitudinal sides of the chassis 24 and inside the chassis 24. The frame 16 also comprises a junction wall 25 extending between one end of the inside wall 21 and the chassis 24. Therefore the inside wall 21, the junction wall 25 and the chassis 24 define a series of air flow chambers 23.

The seal 14 may have the same shape than the frame 16 i.e. the seal 14 may also forms a chicane.

The magnetic layer 20c attached to the frame 16 may have the same shape than the frame 16 i.e. the magnetic layer 20c may also forms a chicane.

The attractant layer 30c in magnetic adhesion with said magnetic layer 20c attached to the frame 16 may have the same shape than the frame 16 i.e. the attractant layer may also forms a chicane.

In variant, the frame 16 may have another shape like for example a manifold shape. The frame 16 may have the same shape than the one disclosed in document U.S. Pat. No. 6,318,778, which is herein incorporated in its entirety.

In any case, the top plate 12 and the frame 16 could be two different parts or could be in one piece.

Figure 9:
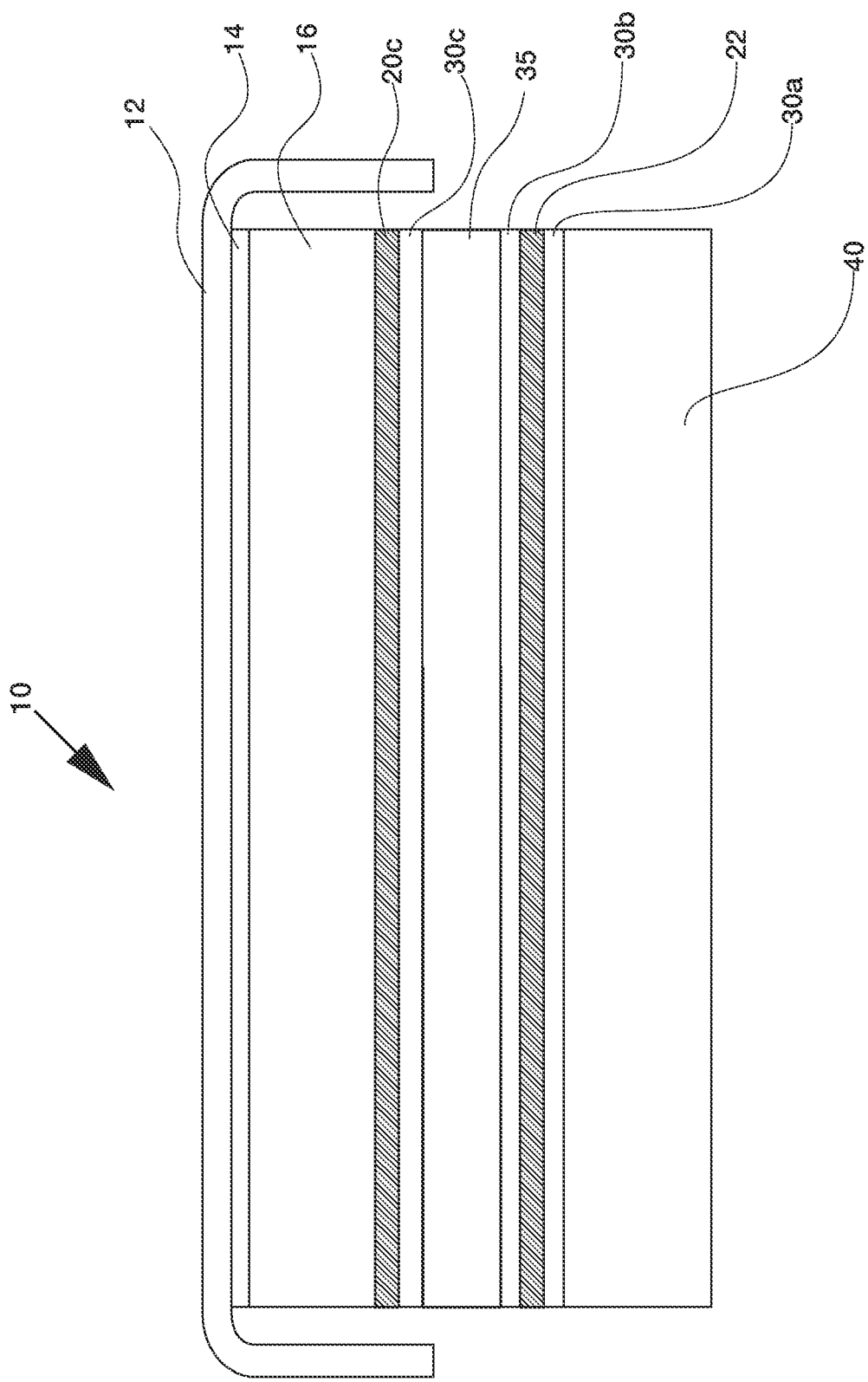
FIG. 9 shows an end perspective view of a foam vacuum gripper device according to a second embodiment of the invention.
Figure 10:
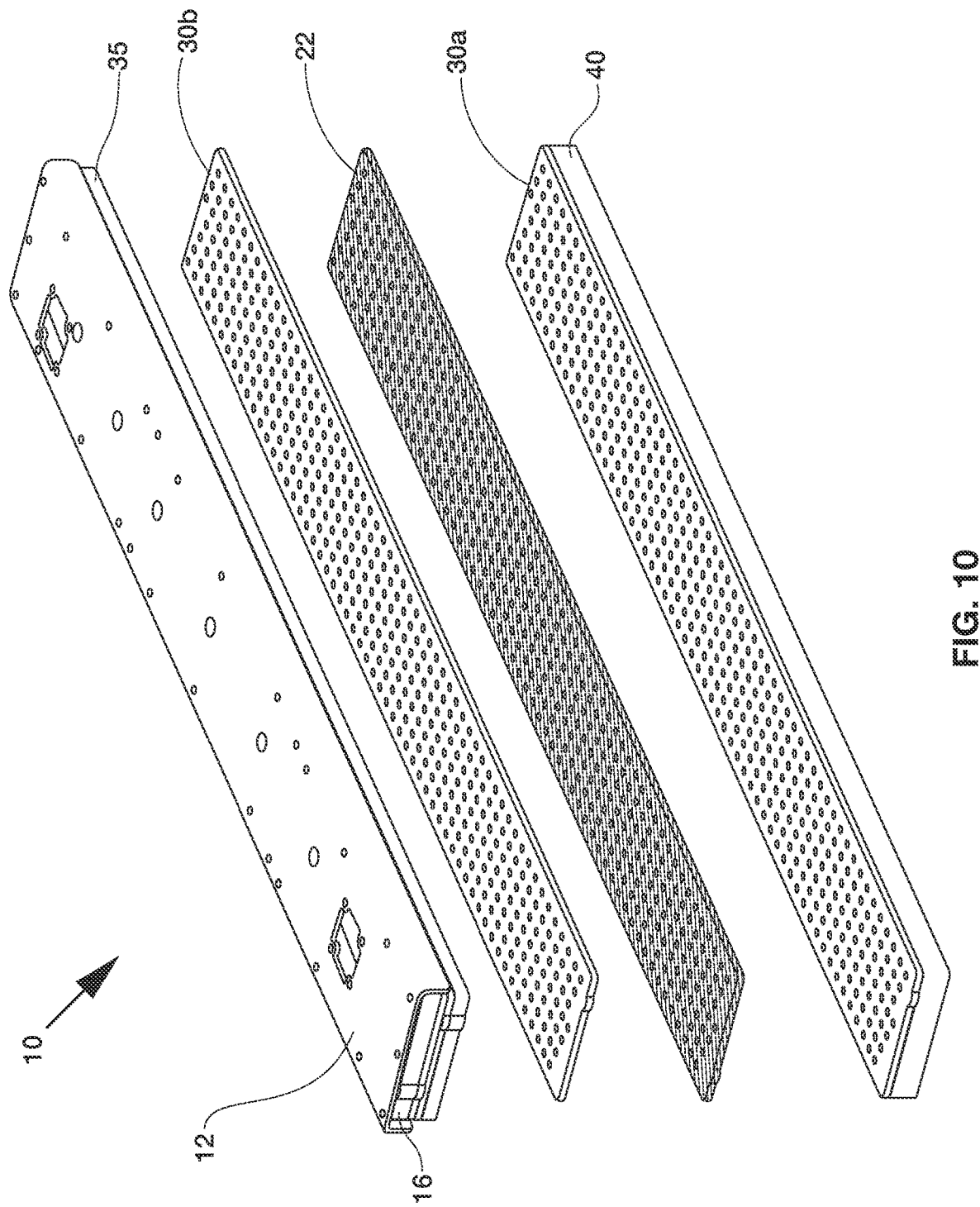
FIG. 10 shows an exploded view of the foam vacuum gripper device introduced in FIG. 9.
Figure 11:
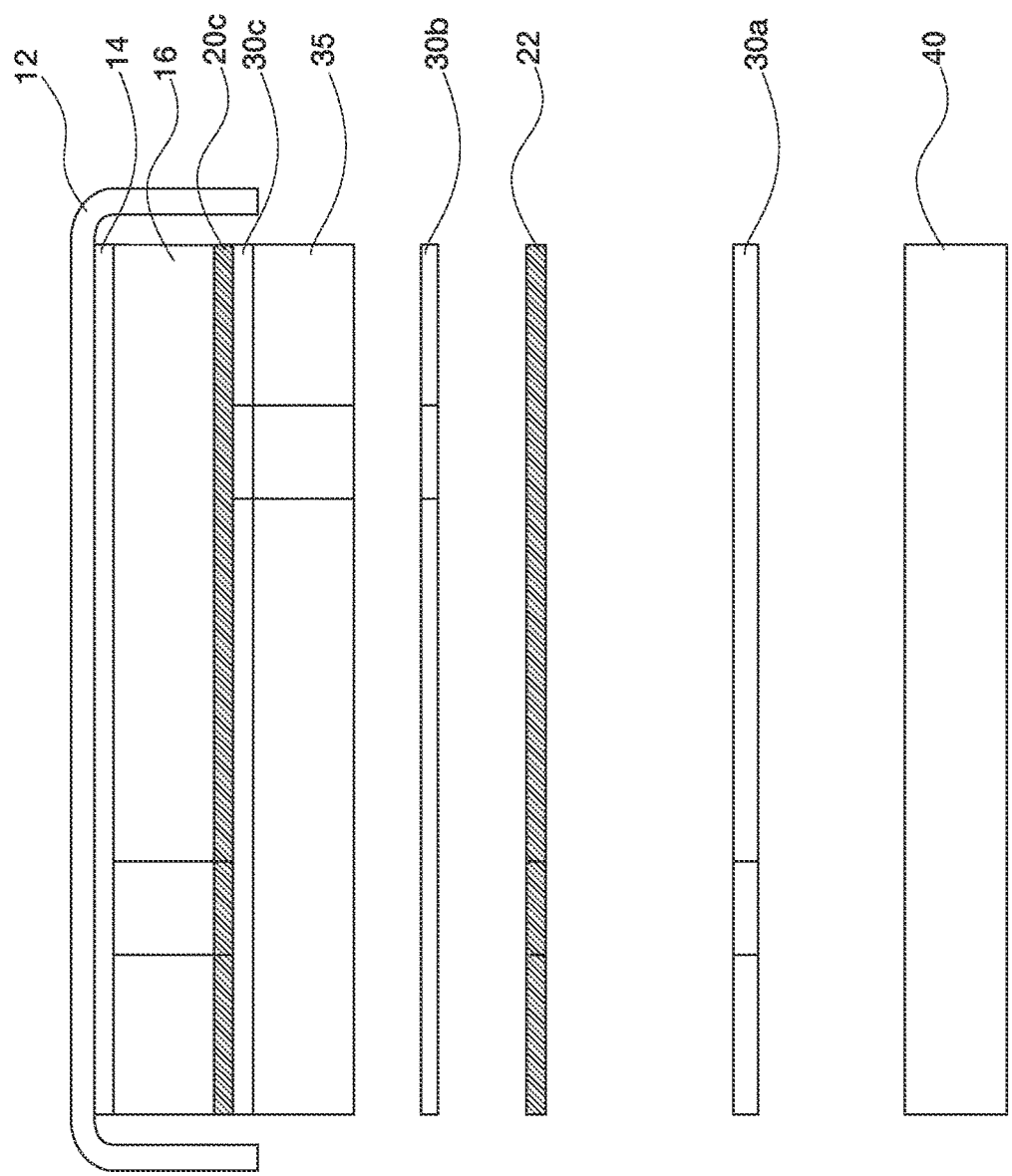
FIG. 11 shows an exploded end view of the foam vacuum gripper device introduced in FIG. 9.

FIGS. 9-11 illustrate a second embodiment that is the same than the first embodiment except considering the bottom plate 22.

In a first variant, the bottom plate 22 is composed of just one auxiliary layer.

For example the bottom plate is directly in a magnetic material. Both sides of the bottom plate 22 are then magnetized. Therefore it is easier to change the bottom plate 22 which could be all at once secured to an attractant layer 30b secured to the remaining part of the body 13 and to an attractant layer 30a secured to the foam layer 40. The bottom plate 22 may be a magnetic layer (like the magnetic layer 20a or 20b of the first embodiment).

In another example the bottom plate is directly in an attractant material. Therefore it is easier to change the bottom plate 22 which could be all at once secured to a magnetic layer secured to the remaining part of the body 13 and to a magnetic layer secured to the foam layer 40.

In a second variant, the bottom plate 22 is composed of two auxiliary layers: one upper magnetic layer and one lower magnetic layer. The upper magnetic layer is secured to the upper face of the lower magnetic layer. All auxiliary layers are fixed together for example by adhesive. Therefore the auxiliary layers of the bottom plate 22 are not dedicated to be removed from one to another.

Figure 22:
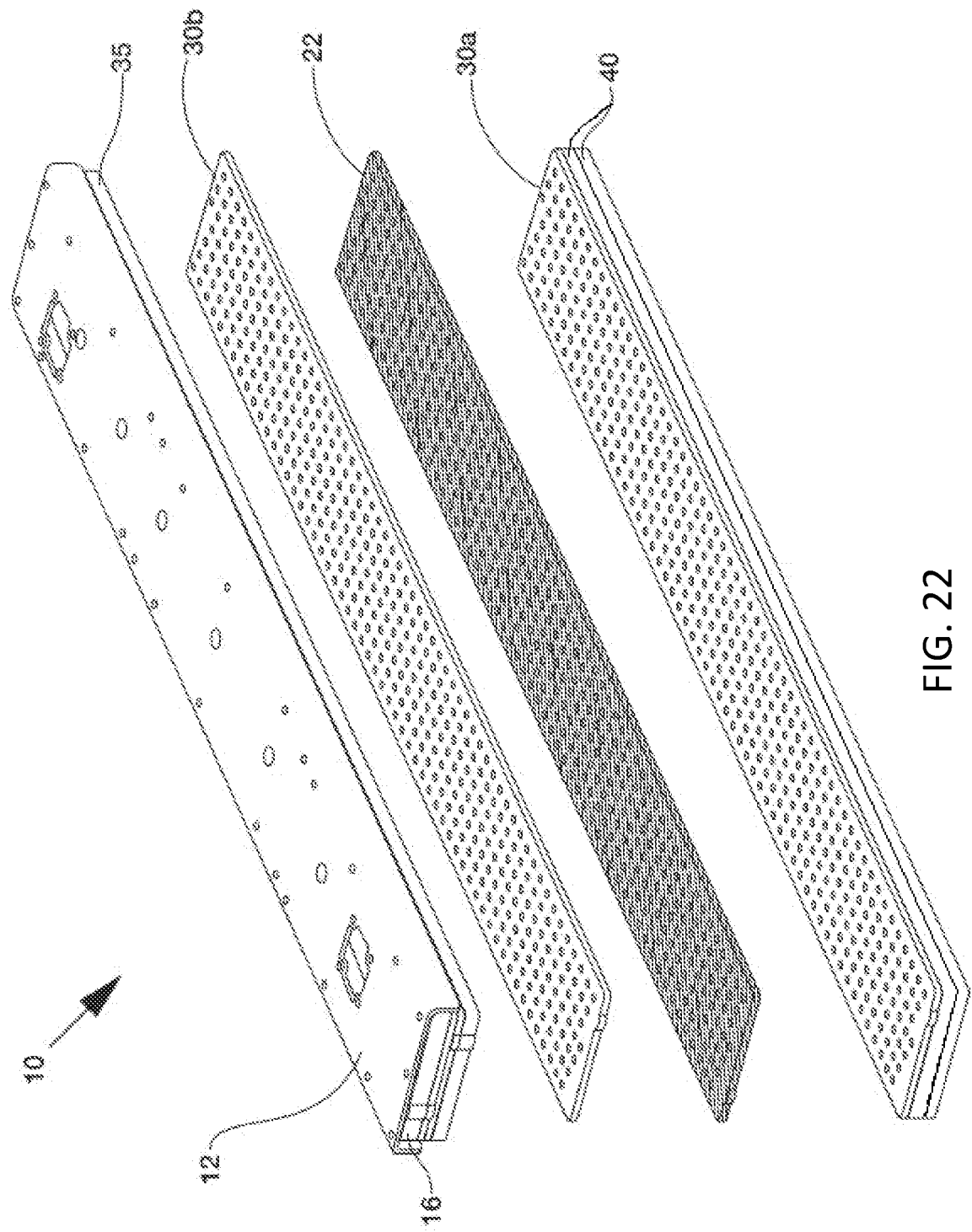
FIG. 22 shows an exploded view of a foam vacuum gripper device according to an embodiment of the invention.

In a third variant, in FIG. 22, the device 10 includes at least two foam layers 40, one layer 40 arranged on top of the other, both foam layers 40 being arranged on the bottom surface of the vacuum gripper body 13. Both foams layers 40 are secured to one another by way of a magnetic attraction.

Therefore it is easier to change the bottom plate 22 which could be all at once secured to an attractant layer secured to the remaining part of the body 13 and to an attractant layer secured to the foam layer 40.

Thus, the device 10 is simple in form and structure.

In a third variant, the bottom plate 22 is composed of three auxiliary layers: one upper magnetic layer, one intermediate tie layer and one lower magnetic layer. The upper magnetic layer is secured to the upper face of the tie layer and the lower magnetic layer is secured to the bottom face of the tie layer so that the tie layer is sandwiched between the upper magnetic layer and the lower magnetic layer. The tie layer is for example a sheet metal or an attractant layer or an adhesive layer. All auxiliary layers are fixed together for example by adhesive. Therefore the auxiliary layers of the bottom are not dedicated to be removed from one to another.

Therefore it is easier to change the bottom plate 22 which could be all at once secured to an attractant layer secured to the remaining part of the body 13 and to an attractant layer secured to the foam layer 40.

Thus, the device 10 is simple in form and structure.

For all variants, the bottom plate 22 is then directly secured to the remaining part of the body 13 by magnetic attraction and to the foam layer 40 by magnetic attraction (but without being secured to additional magnetic layer or attractive layer).

Figure 12:
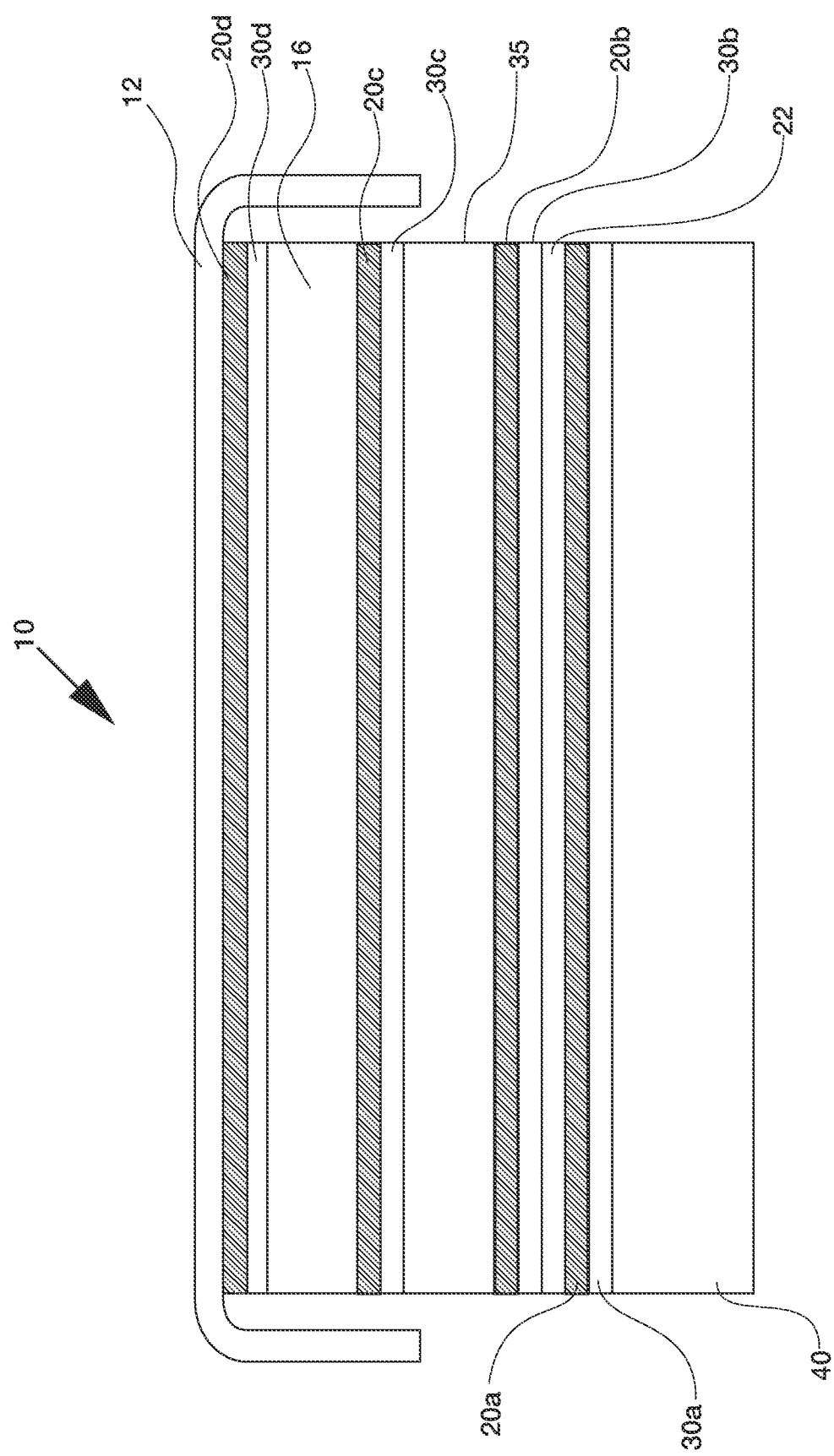
FIG. 12 is an end view of a foam vacuum gripper device according to a third embodiment of the present disclosure.

FIG. 12 illustrates a third embodiment.

In this third embodiment, the device 10 may thus include another couple of attractant layer 30d and magnetic layer 20d, one of the layers included in top plate 12 and the other of the layers included in the frame 16. Optionally, the magnetic layer 20*d* is attached to the bottom face of the top plate 12 and the attractant layer 30*d* is attached to the upper face of the frame 16 but the opposite is also possible. Thus the attractant layer 30*d* is directly above the frame 16, the magnetic layer 20*d* is directly above the attractant layer 30*d* and the top plate is directly above the magnetic layer 20*d*. Optionally the top plate 12 is directly above the frame 16. The top plate 12 and/or the frame 16 may be adhesively attached to the magnetic layer 20*d* or to the attractant layer 30*d*.

Apart from the magnetic adhesion between top plate 12 and frame 16, the device 10 of the third embodiment is the same than the first embodiment.

Figure 13:
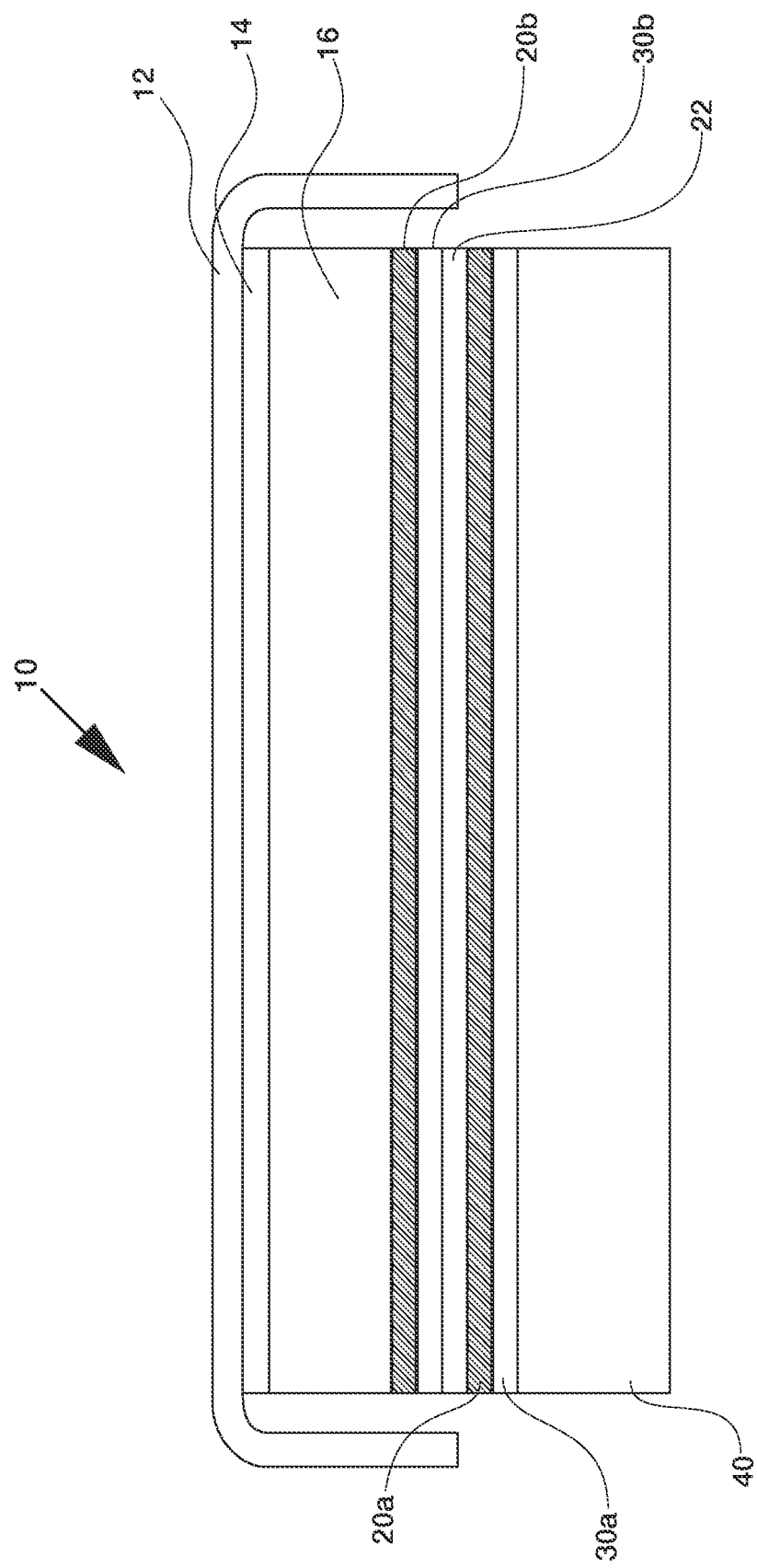
FIG. 13 an end view of a foam vacuum gripper device according to a fourth embodiment of the present disclosure.

FIG. 13 illustrates a fourth embodiment of the invention wherein the upper compartment does not comprise a check valve system 35.

The bottom face of the frame 16 may be secured by magnetic adhesion to the upper face of the bottom plate 22. A magnetic layer 20*b*/attractant layer 30*b* is secured to the bottom face of the frame 16 and a corresponding attractant layer 30*b*/magnetic layer 20*b* is secured to the upper face of the bottom plate 22 so that the bottom plate 22 is secured to the body 13 via the frame 16.

Apart from the absence of check valve system 35, the device 10 of the fourth embodiment is the same than the first embodiment.

Figure 14:
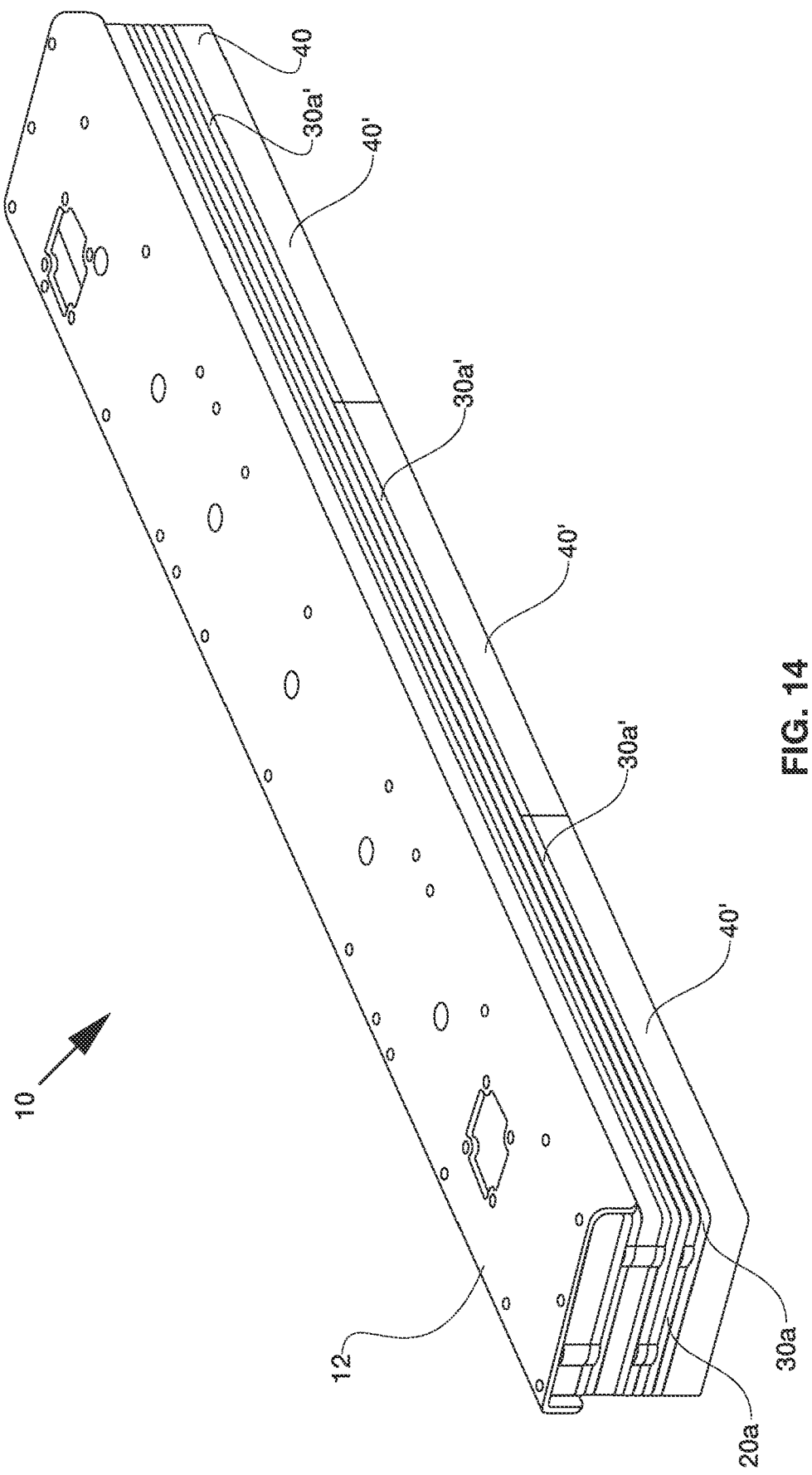
FIG. 14 is a side perspective view of a foam vacuum gripper according to a fifth embodiment of the invention.
Figure 15A:
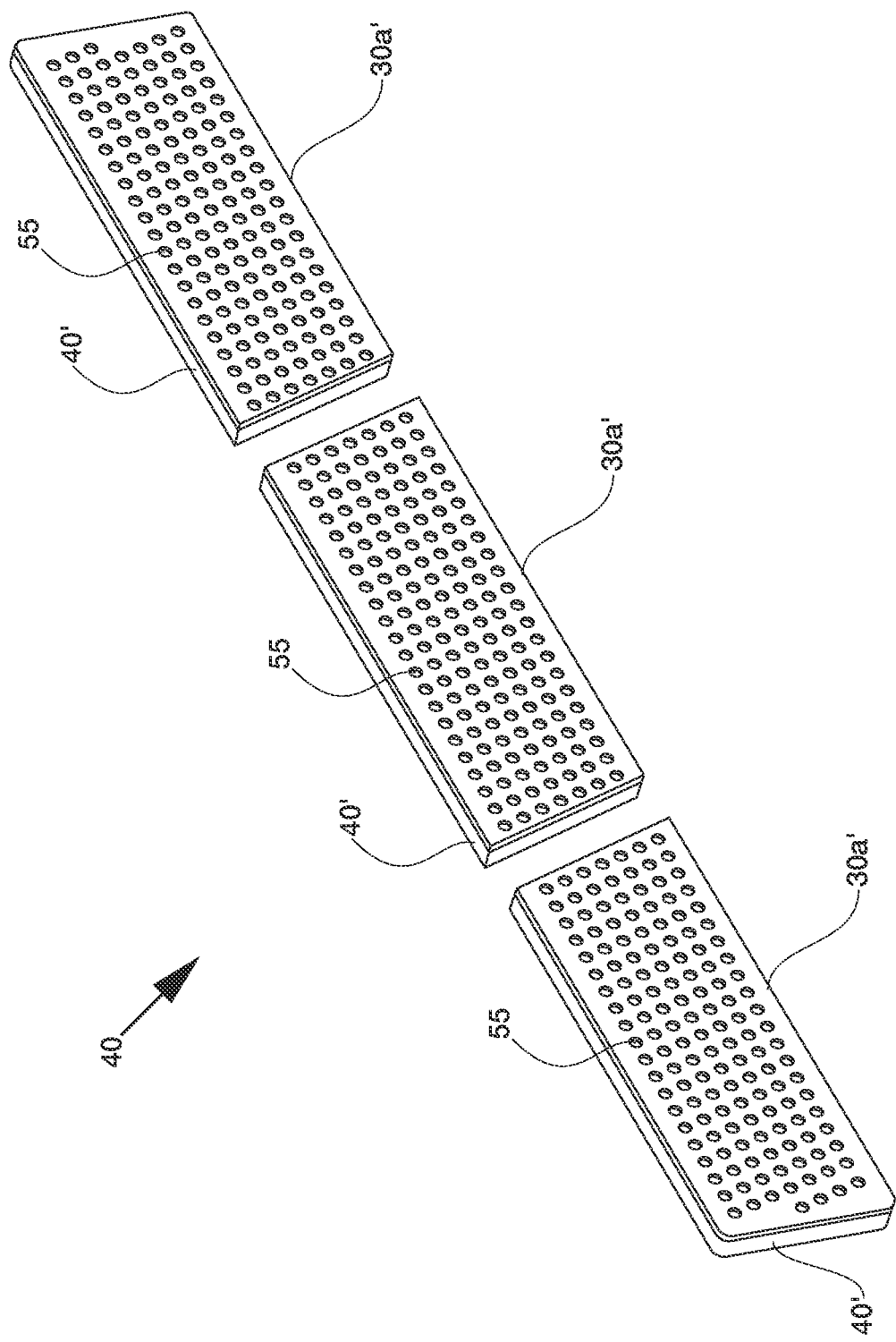
FIG. 15A is a side perspective exploded view of a portion of the device introduced FIG. 14.
Figure 15B:
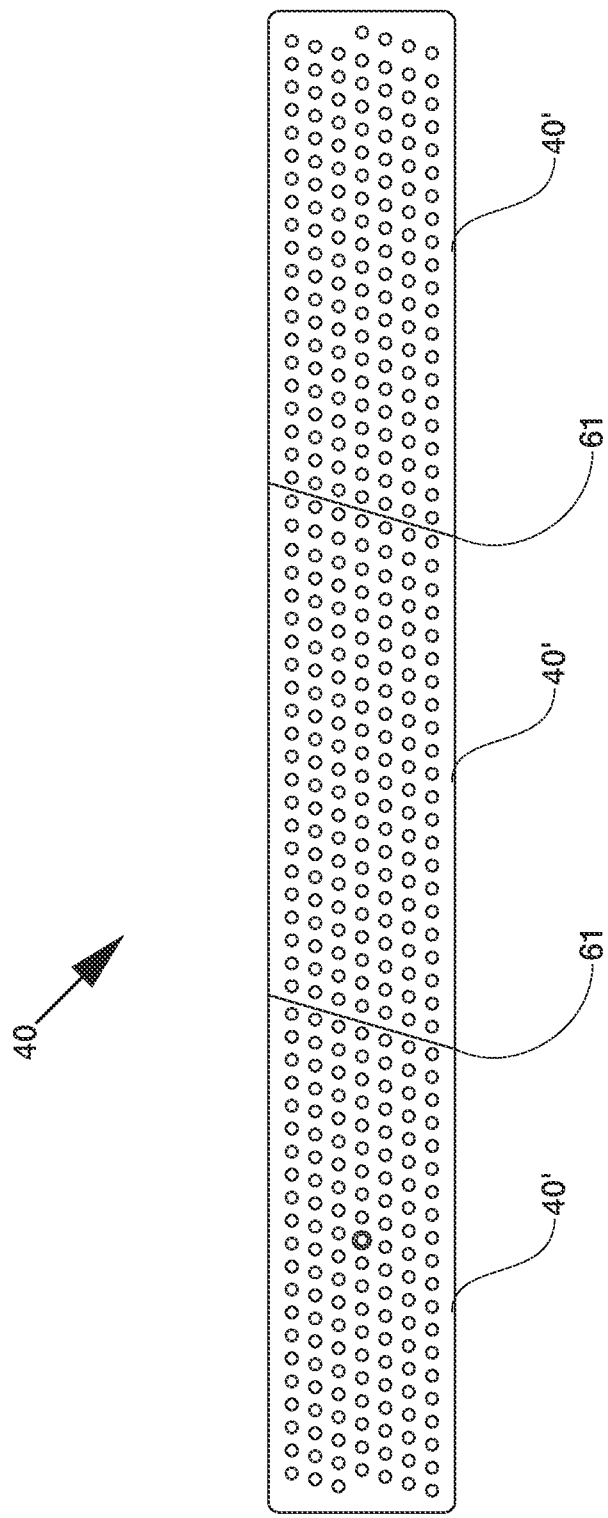
FIG. 15B is a bottom view of the device introduced FIG. 14.

FIGS. 14, 15*a*, 15*b* illustrate a fifth embodiment that it the same than the first embodiment except considering the foam layer 40.

Whereas in other embodiments, the foam layer 40 is a continuous layer so that only one foam layer 40 is in contact with the bottom surface of the body 13 (via potentially magnetic layer and/or attractant layer and/or filter and/or seal). In fact in other embodiments, the foam layer 40 is in one piece and in one layer in order to form a full foam layer, But in the present fifth embodiment the foam layer 40 is composed of at least two foam pieces/sections. The foam layer 40 is then puzzle foam.

The foam layer 40 may comprise at least two foam pieces and may comprise at least three foam pieces. In the present case the foam layer 10 comprises three foam pieces 40'.

The foam pieces 40' may perfectly fit together so that only a junction line 61 could be visible between two adjacent foam pieces 40' or may be slightly distant to one another.

The foam pieces 40' could be secured to one another in a non-removable way or could be individually removable from the layer 40.

Each of the foam pieces 40' could be individually in magnetic attraction with the body 13 or only one or some of foam piece 40' could be individually in magnetic attraction with the body 13 (the other foam piece 40' being only secured (in removable or non-removable way) to the one or some of foam piece 40' individually in magnetic attraction with the body 13).

For example an attractant piece 30*a*' may be secured to each foam piece 40', all attractant pieces 30*a*' forming an attractant layer 30*a* that is secured with a magnetic attraction to the body 13 through a magnetic layer 20*a* (in one or several pieces).

Alternatively, a magnet piece could be secured to each foam piece 40', all magnet pieces forming a magnet layer that is secured with a magnetic attraction to the body 13 through an attractant layer 30*a* (in one or several pieces). At least one of the foam pieces 40' may include a magnetic attraction to another foam piece 40'. For example, all foam pieces 40' is individually in magnetic attraction with the body 13 but the foam pieces 40' are not secured between them. Therefore, it is possible to change only one portion of the foam layer 40 and not all the foam layer 40.

Figure 16:
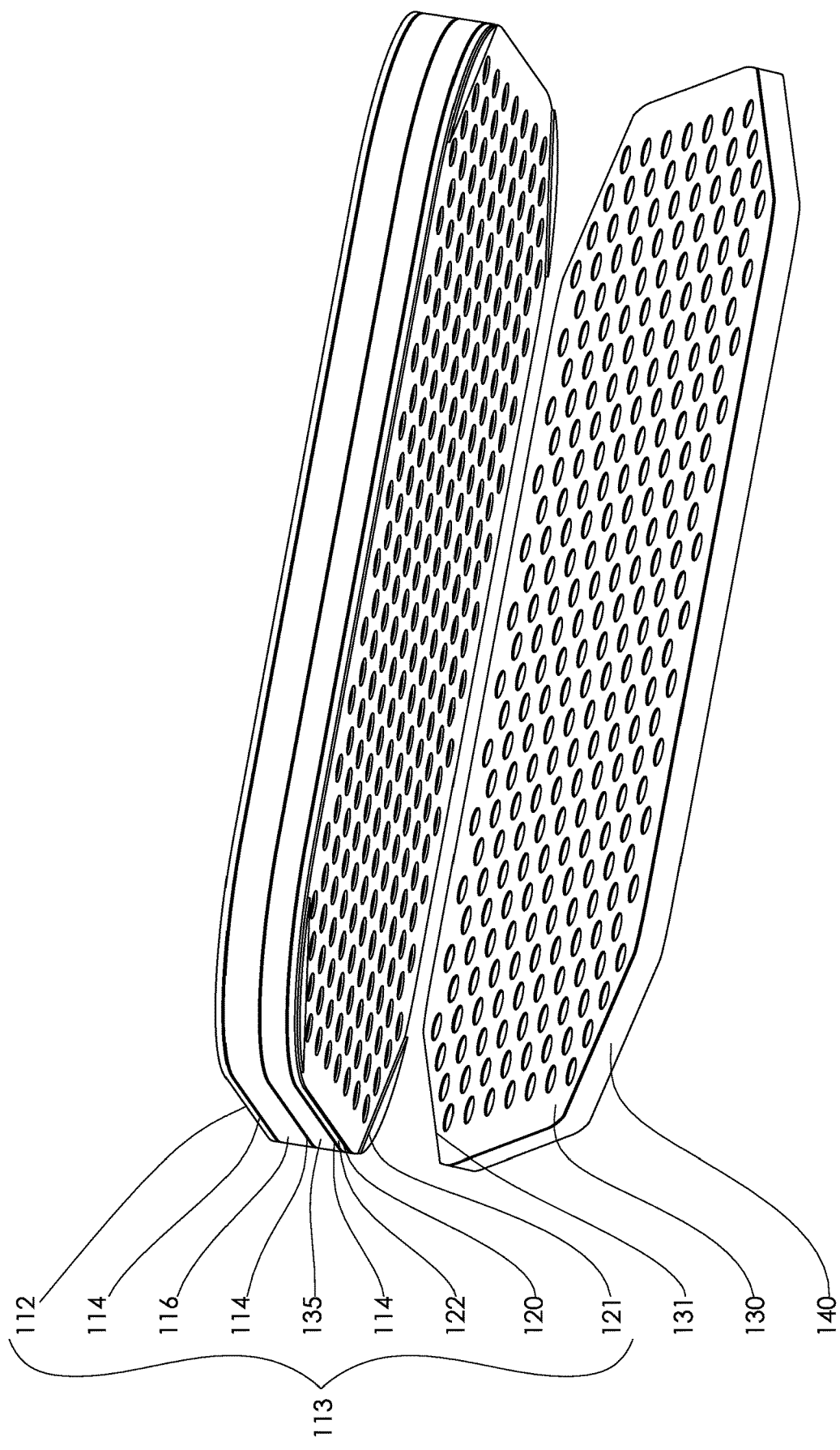
FIG. 16 is an exploded perspective view of a foam vacuum gripper according to a sixth embodiment of the invention.
Figure 17:
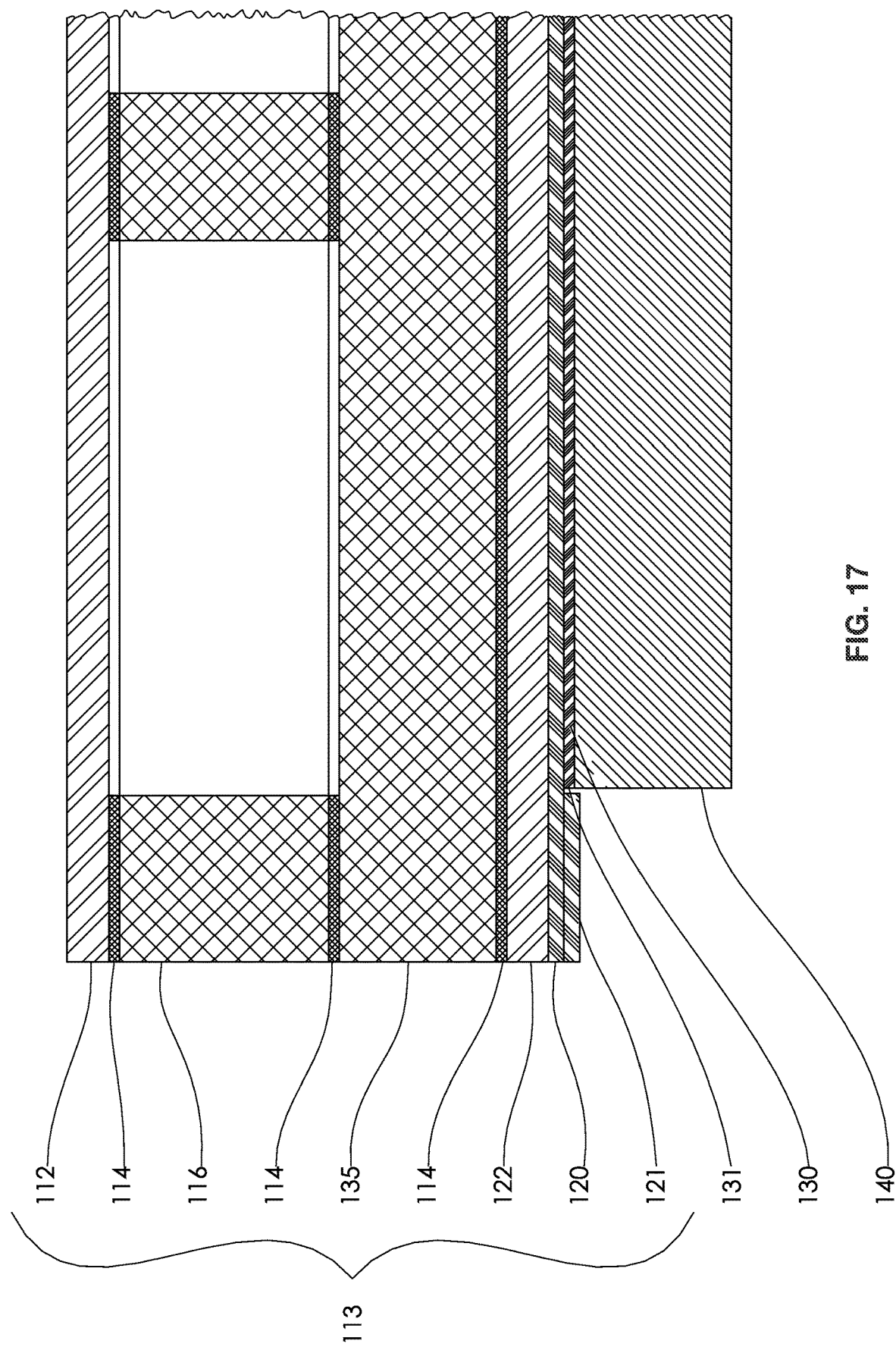
FIG. 17 is a cross sectional partial view of the device introduced in FIG. 16.

FIGS. 16 and 17 illustrate a sixth embodiment that it the same than the first embodiment except considering the connection between the different layers.

In this sixth embodiment, only the foam 140 and the bottom plate 122 are secured to each other by magnetic attraction.

Other layers are secured one to another by other means than magnetic attraction.

For example the interface between the top plate 112 and the frame 116 may only be a seal 114. The interface between the frame 116 and the check valve system 135 may only be a seal 114. The interface between the check valve system 135 and the bottom plate 122 may only be a seal 114.

In the present invention for any previously disclosed embodiment, the device may comprise at least one alignment element for alignment of one layer relatively to another layer and/or the device may comprise at least one alignment element for alignment of the foam layer relatively to the body. The alignment element may be removable from the device. The alignment element could be used only when positioning one layer relatively to another and/or could be used in service to prevent relatively displacement between two layers for example to prevent lateral movement of a layer considering the others. Alignment element could use the holes arranged in one or several layers.

In a first variant (disclosed in the sixth embodiment illustrated FIGS. 16-17 also this variant could also be used with any of the first to fifth embodiments illustrated FIGS. 1 to 15), the device 110 comprises four alignment elements 121.

These alignment elements 121 are secured to one of the magnetic layer 120 so that magnetic layer 120 presents a more important thickness at the level of the alignment elements 121. Alignment elements 121 may be in a magnetic material. Alignment elements 121 may be in the same magnetic material that the magnetic layer. Alignment elements 121 may be in one piece with the magnetic layer 120 or may be additional parts affixed to the magnetic layer.

Alignment elements 121 may be arranged on each corner of the magnetic layer or in the middle of the edges or elsewhere.

Alignment elements 121 may be arranged on the magnetic layer 120 that is secured to the attractant layer 130 itself secured to the foam layer 140.

The foam layer 140 and attractant layer 130 are cut on their corners so that they bear against the alignment elements 121 (on faces 131).

Thus alignment elements 121 may then stop lateral movement of the foam layer 140 relatively to the body 113 (and also to stop lateral movement of the attractant layer 130 secured to the foam layer 140).

Alignment elements 121 may help also for the assembly of the foam layer 140 (and its secured attractant layer 130) on the magnetic layer 122. In particular alignment elements 121 may give a hard stop against which it is possible to start locating the assembly of the foam layer 140 plus its attractant layer 130 before laying completely this assembly on the magnetic layer 120.

Some functional clearance between faces 131 and the alignment elements 121 may be present to facilitate the arrangement of said assembly onto said magnetic layer.

Figure 18:
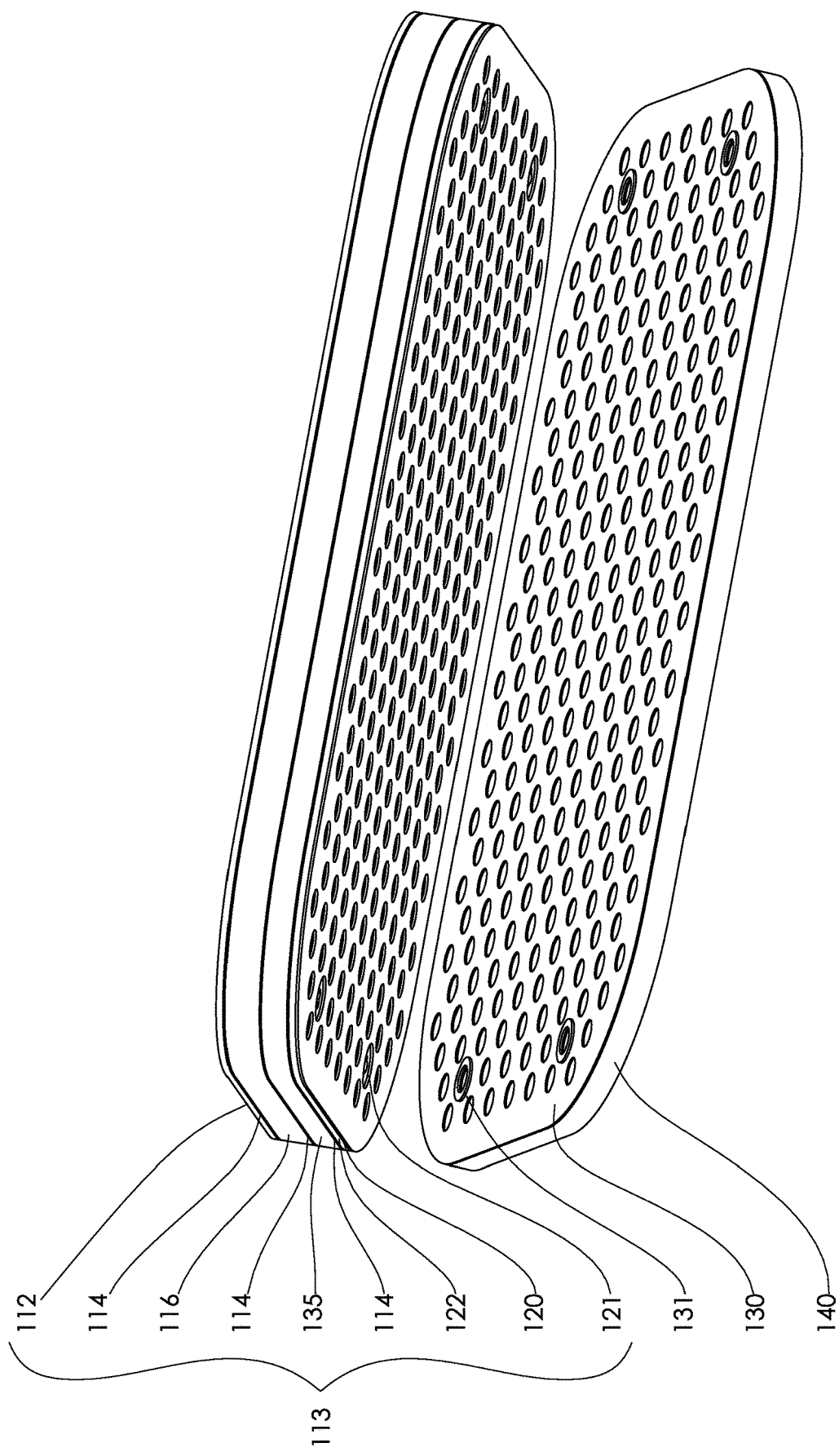
FIG. 18 is an exploded perspective view of a foam vacuum gripper according to a seventh embodiment of the invention.
Figure 19:
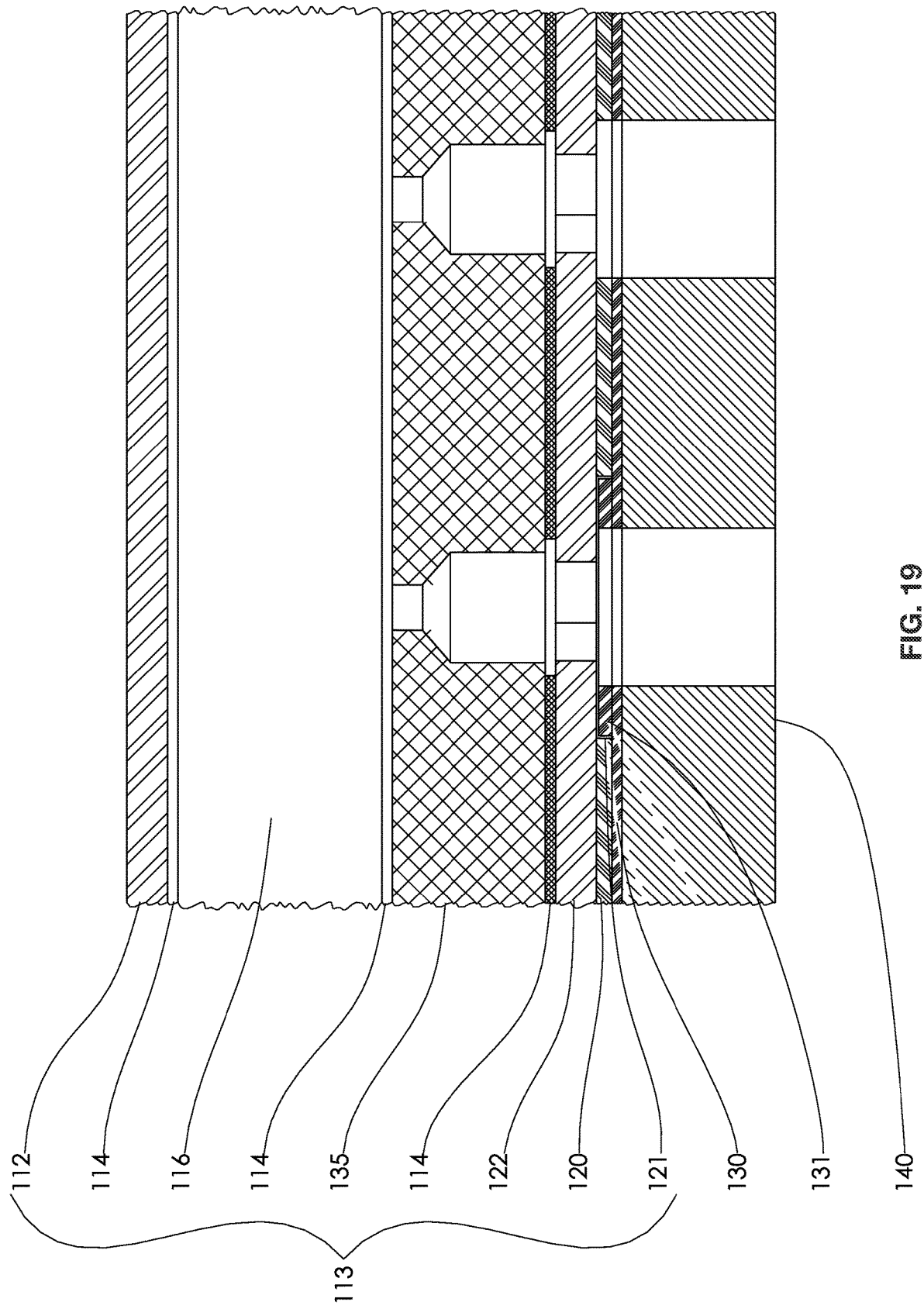
FIG. 19 is a cross sectional partial view of the device introduced in FIG. 18.

In a second variant (disclosed in a seventh embodiment illustrated FIGS. 18 and 19 also this variant could also be used with any of the first to sixth embodiments illustrated FIGS. 1 to 17), alignment elements are different.

In this second variant, alignment elements are alignment pins 131 that may be fixed to the attractant layer 130. For example there are four pins 131 each associated to one corner of the attractant layer 130.

Preferably, each pin 131 is also fixed to the foam layer 140. For example each pin 131 is arranged inside one on the hole already present in the attractant layer 130 and the adjacent hole of the foam layer 140.

This avoids manufacturing extra holes in the foam 140 and its attractant layer 130 to arrange pins 131.

Pins 131 are then concentric with holes in the foam layer 140 and its attractant layer 130.

Pins 131 may be hollow pins.

These pins 131 get located inside the magnetic layer 120 on holes 121 of said magnetic layer 120. Preferably, said holes 121 are holes already present in the magnetic layer (but that may be enlarged to receive the pins 131).

There may be mounting clearance between at least one of the pin 131 and the corresponding hole 121. This will facilitate the assembly while keeping a good enough alignment of the foam layer 140 regarding to the magnetic layer 120.

In a third variant (disclosed in an eight embodiment illustrated FIGS. 20 and 21 also this variant could also be used with any of the first to seventh embodiments illustrated FIGS. 1 to 19), alignment elements are different.

In this third variant, alignment elements are alignment pins that may be fixed to one of the layer. For example there are four pins each associated to one corner of the corresponding layer.

In this third variant alignment elements are alignment pins arranged inside dedicated holes inside one or several layers of the device.

The alignment pins may be bolts.

The alignment pins may extend through all the layers of the device.

For example the alignment pins are bolts with the screw head against the bottom of the bottom plate 122 and the nut against the top of the top plate 112. The larger section of the screw pin 150 of said bolts goes through a specific hole 121 inside the magnetic layer 120, then through a specific hole 131 inside the attractant layer 130 and finally only partially inside the foam 140 through a dedicated hole 141. There may be mounting clearance between at least one of the screw pin 150 and the various associated holes (121, 131 and 141). This will facilitate the mounting while keeping a good enough alignment with regards to the bottom plate 122.

The dedicated hole 141 may be circumferentially closed or may be circumferentially opened toward the outside (so that a thin foam wall is removed).

In a fourth variant, alignment elements are not always fixed to the gripper.

Alignment elements may be removable pins.

Alignment elements may be inserted inside the device through one, several, or all the different layers of the device.

Alignment elements may be placed inside already functional suction holes.

Therefore, there is no need to manufacture extra holes inside the corresponding layers of the device.

Alignment elements may be installed inside suction holes in the bottom plate and could be used to locate the assembly of the foam with the bottom plate (through the couple of magnetic layer and attractant layer).

Figure 20:
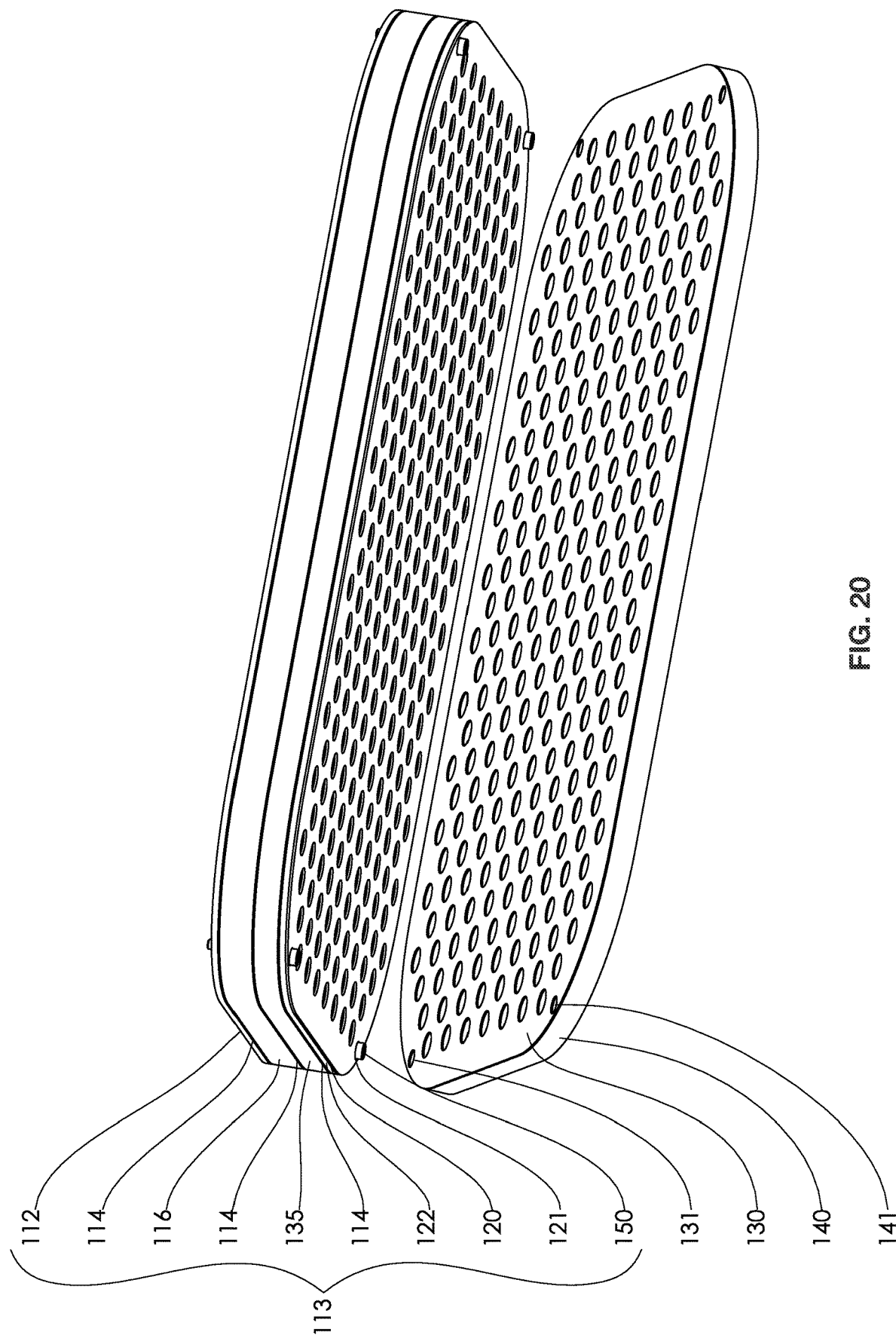
FIG. 20 is an exploded perspective view of a foam vacuum gripper according to an eighth embodiment of the invention.
Figure 21:
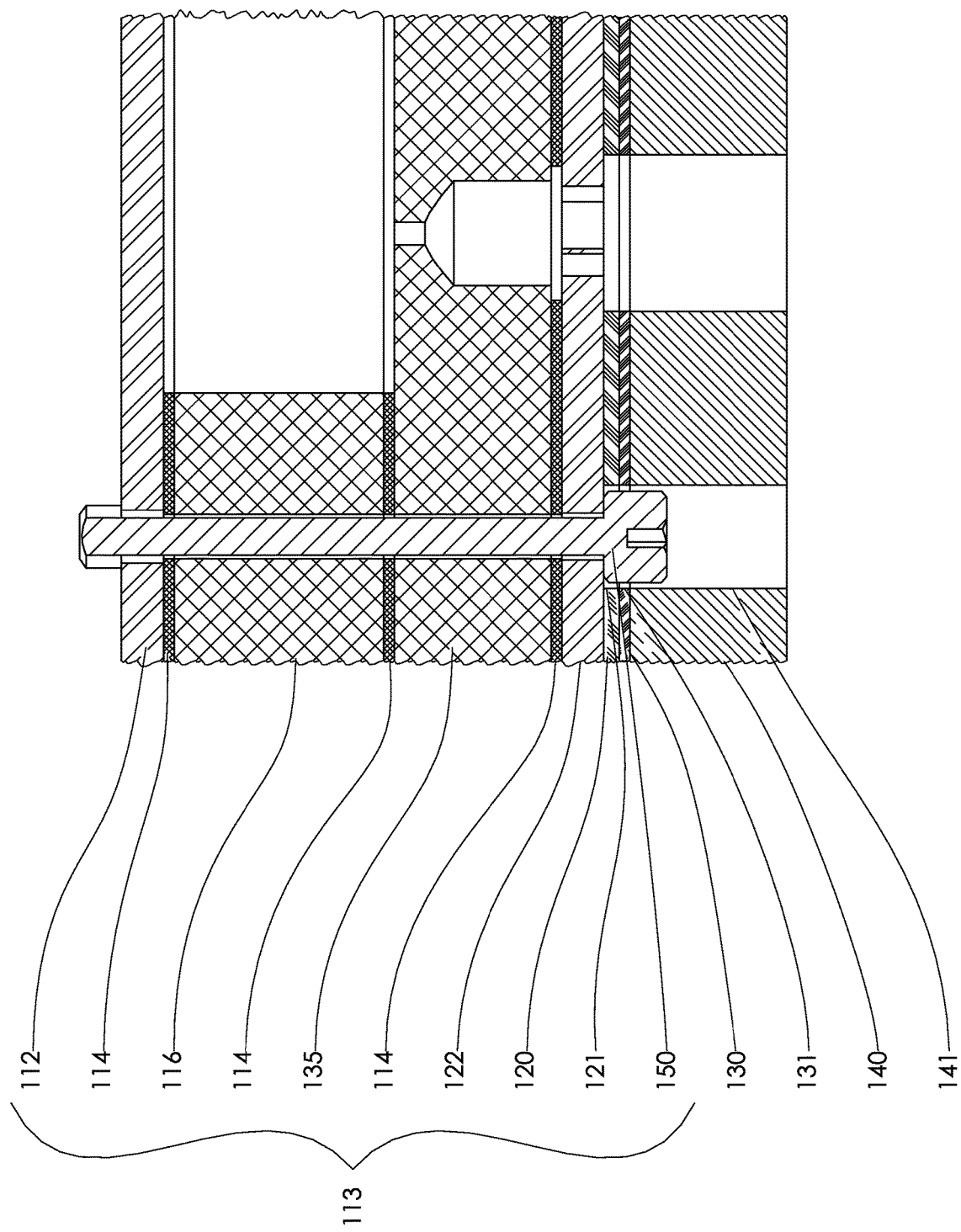
FIG. 21 is a cross sectional partial view of the device introduced in FIG. 20.

Alignment elements may be longer than the one illustrated FIGS. 20-21 to be able to guide the different layers on a longer distance for example for making the relative placement between the different layers easier.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

Sections and layers being interchangeable as mentioned and only distinguished herein to assist in some embodiments to help distinguish an upper compartment labeled with sections and a lower bottom labeled with layers. Sections and layers may be complete layers, sectioned, incomplete, and/or partial layers/sections.

One or several embodiments could be mixed to each other. For example the device may comprise a magnetic attraction between the top plate 12 and the frame 16 like in the third embodiment but without a check valve system like in the fourth embodiment.

In some instances, portions/sections/layers/assemblies/compartments of the device may be secured by means other than a magnetic attraction, by way of example by adhesive, screws, bolts, etc. (except the foam layer that is at least secured to the body by magnetic attraction). At least two portions/layers/assemblies/compartments may be secured by means of the magnetic attraction and also by means other than a magnetic attraction, by way of example by adhesive, screws, bolts, etc.

Other examples may include an alternating magnet layer and attractant layer, with the magnet layer and the attractant layer being color coded to aid in ease of assembly and dis-assembly. Magnetic layers could be of one color and attractant layers of another color and/or each couple of magnetic layer-attractant layer could be of a color different from the other couples.

In certain embodiments, more magnet surface area may increase the securing force. Some examples may include areas designed to maximize magnetic surface area and/or magnetic force in certain portions/sections/layers/assemblies/compartments.

In all embodiments disclosed in the present application the attractant layer and the magnetic layer used to secured by magnetic attraction two main layers could be inversed: each main layer could be indifferently associated to the magnetic layer or the attractant layer (and so the other main layer could be indifferently associated to respectively the attractant layer or the magnetic layer).

Some examples include a filter layer that filters dust and debris from the device. The filter layer could be arranged between a magnetic layer and/or an attractive layer and/or a main layer. The layers secured through a magnetic attraction are easily dis-assembled to allow the filter layer to stay intact and be cleaned or replaced without damaging the layers, foam, and/or filter.

The frame could be in a single part or could be of multiple pieces.

The frame could be in one piece with the top plate or the top plate and the frame could be two different parts.

The device could comprise no seal in particular no seal between the top plate and the frame.

The magnetic layers may be full magnetic layers or may be layers with portions that are magnetic and/or portions that include magnets. Similarly, attractant layers may be fully attractant layers and/or may include portions that are attractant.

The magnetic attraction between two layers of the device (even between the foam layer and the body) could be made without additional magnetic attraction and/or attractant layer. For example a main layer of the device could be made of magnetic material and/or an adjacent main layer of an attractive material so that one or both layers are secured to one another with intervention of only one additional layer or without intervention of additional layers.

The device may include any of the cited assemblies and exclude any of the cited assemblies and/or may include any of the cited layers and exclude any of the cited layers (but the device requires at least a body and a foam layer).

In some instances, the device may include more than one foam layer. Foam layers may be stacked foam layers. There may be a first foam layer and a second foam layer. The foam layers may include a magnetic layer and an attractant layer and be secured one to another by a magnetic attraction.

The device may be a port device, a valve gripper device, a foam valve gripper or another kind of device like for example bag gripper. Therefore, the device could have a different shape than the one illustrated. Depending on the kind of device, the air ducts and/or suction holes may have also a different form than the one illustrated.

What is claimed is:

1. A foam vacuum gripper device comprising at least a vacuum gripper body and at least one foam layer arranged on a bottom surface of the vacuum gripper body, the foam vacuum gripper device being characterized in that at least the foam layer is secured to the vacuum gripper body by way of a magnetic attraction between the bottom surface of the vacuum gripper body and the foam layer;
wherein the device includes an attractant layer and a magnetic layer, one of the layers included in the vacuum gripper body and the other layer included in the foam layer, wherein the device includes a series of air ducts extending at least through the foam layer, the magnetic layer and the attractant layer;
wherein the magnetic layer is a layer that is entirely magnetic over its entire surface,
wherein said attractant layer is a layer of rubber steel;
wherein said attractant layer is itself a sealing layer;
wherein the foam vacuum gripper device does not comprise an additional sealing layer, other than the attractant layer, between the vacuum gripper body and the foam layer.

2. The device according to claim 1, wherein the foam layer is a continuous layer so that only one foam layer is in contact with the bottom surface of the foam vacuum gripper body.

3. The device according to claim 1, wherein the foam layer is puzzle foam, the foam layer being then composed of at least two foam pieces assembled together.

4. The device according to claim 1, comprising at least two foam layers, one layer arranged on top of the other, both foam layers being arranged on the bottom surface of the vacuum gripper body.

5. The device according to claim 4, wherein both foam layers are secured to one another by way of a magnetic attraction.

6. The device according to claim 1, comprising at least one filter arranged between two main layers of the device.

7. The device according to claim 1, comprising at least one alignment element for alignment of the foam layer relatively to the vacuum gripper body.

8. The device according to claim 7, wherein the alignment element is removable from the device.

9. The device according to claim 7, wherein the alignment element is an alignment pin.

10. The device according to claim 1, wherein the vacuum gripper body includes a bottom plate, the bottom plate being removably secured on one face to remaining part of the vacuum gripper body through magnetic attraction and the foam layer being also removably secured to an opposite face of the bottom plate through the magnetic attraction, the foam layer being then removably secured to the vacuum gripper body through the bottom plate.

11. The device according to claim 10, wherein the bottom plate is comprised solely of magnetic or attractant material.

12. The device according to claim 1, wherein the vacuum gripper body includes a frame and a top plate, the top plate being also secured to the frame by way of a magnetic attraction between top plate and frame.

13. The device according to claim 1, wherein the vacuum gripper body includes a frame and a leakage limiter system, the leakage limiter system being also secured to the frame by way of a magnetic attraction between the leakage limiter system and frame.

14. A foam vacuum gripper device according to claim 1, wherein the attractant layer is made of a single material and the magnetic layer is made of a single material.

15. A foam vacuum gripper device according to claim 1, wherein magnetic attraction realized by the magnetic layer is homogeneous over the entire surface of the magnetic layer.

16. A foam vacuum gripper device according to claim 1, wherein magnetic layer is shaped as a plate and the attractive layer is shaped as a plate.

17. A foam vacuum gripper device according to claim 1, wherein the attractant layer or the magnetic layer is attached to the bottom surface of the vacuum gripper body so as to form a part itself.

18. A foam vacuum gripper device according to claim 17, wherein the attractant layer or the magnetic layer is adhesively attached to the bottom surface of the vacuum gripper body.

19. A foam vacuum gripper device comprising at least a vacuum gripper body and at least one foam layer arranged on a bottom surface of the vacuum gripper body, the foam vacuum gripper device being characterized in that at least the foam layer is secured to the vacuum gripper body by way of a magnetic attraction between the bottom surface of the vacuum gripper body and the foam layer, wherein the device includes an attractant layer and a magnetic layer, one of the layers included in the vacuum gripper body and the other layer included in the foam layer,
wherein the magnetic layer is conformed in order to present a section with same form and/or same dimensions of the vacuum gripper body if the magnetic layer is included on the vacuum gripper body or of the foam layer if the magnetic layer is included in the foam layer,
wherein the magnetic layer is a layer that is entirely magnetic over its entire surface,
wherein said attractant layer is a layer of rubber steel,
wherein said attractant layer is itself a sealing layer;
wherein the foam vacuum gripper device does not comprise an additional sealing layer, other than the attractant layer, between the vacuum gripper body and the foam layer.

20. A foam vacuum gripper device comprising at least a vacuum gripper body and at least one foam layer arranged on a bottom surface of the vacuum gripper body, the foam vacuum gripper device being characterized in that at least the foam layer is secured to the vacuum gripper body by way of a magnetic attraction between the bottom surface of the vacuum gripper body and the foam layer, wherein the vacuum gripper body includes a bottom plate, the bottom plate being removably secured on one face to remaining part of the vacuum gripper body through magnetic attraction and the foam layer being also removably secured to an opposite face of the bottom plate through the magnetic attraction, the foam layer being then removably secured to the vacuum gripper body through the bottom plate and wherein the bottom plate is comprised solely of magnetic or attractant material.

21. A foam vacuum gripper device comprising at least a vacuum gripper body and at least one foam layer arranged on a bottom surface of the vacuum gripper body, the foam vacuum gripper device being characterized in that at least the foam layer is secured to the vacuum gripper body by way of a magnetic attraction between the bottom surface of the vacuum gripper body and the foam layer, wherein the vacuum gripper body includes a frame and a top plate, the top plate being also secured to the frame by way of a magnetic attraction between top plate and frame.

22. A foam vacuum gripper device comprising at least a vacuum gripper body and at least one foam layer arranged on a bottom surface of the vacuum gripper body, the foam vacuum gripper device being characterized in that at least the foam layer is secured to the vacuum gripper body by way of a magnetic attraction between the bottom surface of the vacuum gripper body and the foam layer, wherein the vacuum gripper body includes a frame and a leakage limiter system, the leakage limiter system being also secured to the frame by way of a magnetic attraction between the leakage limiter system and frame.

23. A foam vacuum gripper device comprising at least a vacuum gripper body and at least one foam layer arranged on a bottom surface of the vacuum gripper body, the foam vacuum gripper device being characterized in that at least the foam layer is secured to the vacuum gripper body by way of a magnetic attraction between the bottom surface of the vacuum gripper body and the foam layer;
wherein the device includes an attractant layer and a magnetic layer, one of the layers included in the vacuum gripper body and the other layer included in the foam layer, wherein the device includes a series of air ducts extending at least through the foam layer, the magnetic layer and the attractant layer,
wherein the magnetic layer is a layer that is entirely magnetic over its entire surface, wherein the foam layer is puzzle foam, the foam layer being then composed of at least two foam pieces assembled together.

24. A foam vacuum gripper device comprising at least a vacuum gripper body and at least one foam layer arranged on a bottom surface of the vacuum gripper body, the foam vacuum gripper device being characterized in that at least the foam layer is secured to the vacuum gripper body by way of a magnetic attraction between the bottom surface of the vacuum gripper body and the foam layer;
wherein the device includes an attractant layer and a magnetic layer, one of the layers included in the vacuum gripper body and the other layer included in the foam layer, wherein the device includes a series of air ducts extending at least through the foam layer, the magnetic layer and the attractant layer,
wherein the magnetic layer is a layer that is entirely magnetic over its entire surface, comprising at least two foam layers, one layer arranged on top of the other, both foam layers being arranged on the bottom surface of the vacuum gripper body.

* * * * *